United States Patent
Lin et al.

(10) Patent No.: US 11,503,061 B1
(45) Date of Patent: Nov. 15, 2022

(54) AUTOMATIC EVALUATION OF REMEDIATION PLANS USING EXPLOITABILITY RISK MODELING

(71) Applicant: Rapid7, Inc., Boston, MA (US)

(72) Inventors: Wah-Kwan Lin, Melrose, MA (US); Leonardo Varela Guevara, Austin, TX (US); Cody Pierce, Austin, TX (US)

(73) Assignee: Rapid7, Inc., Boston, MA (US)

( * ) Notice: Subject to any disclaimer, the term of this patent is extended or adjusted under 35 U.S.C. 154(b) by 390 days.

(21) Appl. No.: 16/780,695

(22) Filed: Feb. 3, 2020

(51) Int. Cl.
| | |
|---|---|
| *H04L 9/40* | (2022.01) |
| *G06Q 10/06* | (2012.01) |
| *G06Q 10/10* | (2012.01) |
| *G06N 20/00* | (2019.01) |
| *G06N 7/00* | (2006.01) |
| *G06F 8/65* | (2018.01) |
| *G06N 5/04* | (2006.01) |
| *G06F 3/0481* | (2022.01) |
| *G06F 3/0484* | (2022.01) |

(52) U.S. Cl.
CPC ............ *H04L 63/1433* (2013.01); *G06F 8/65* (2013.01); *G06N 5/04* (2013.01); *G06N 7/005* (2013.01); *G06N 20/00* (2019.01); *G06Q 10/0635* (2013.01); *G06Q 10/0637* (2013.01); *G06Q 10/10* (2013.01); *H04L 63/102* (2013.01); *H04L 63/20* (2013.01); *G06F 3/0481* (2013.01); *G06F 3/0484* (2013.01)

(58) Field of Classification Search
CPC ... H04L 63/1433; H04L 63/102; H04L 63/20; G06F 8/65; G06F 3/0481; G06F 3/0484; G06N 5/04; G06N 7/005; G06N 20/00; G06Q 10/0635; G06Q 10/0637; G06Q 10/10

See application file for complete search history.

(56) References Cited

U.S. PATENT DOCUMENTS

| | | | |
|---|---|---|---|
| 10,469,526 B2 | 11/2019 | Jaladi et al. | |
| 11,030,311 B1 * | 6/2021 | Lopez | .................. G06F 11/302 |
| 2017/0126712 A1 | 5/2017 | Crabtree et al. | |
| 2018/0165597 A1 | 6/2018 | Jordan et al. | |
| 2018/0316713 A1 * | 11/2018 | Tsironis | ............. H04L 63/1433 |
| 2018/0367553 A1 | 12/2018 | Hayden et al. | |
| 2019/0258953 A1 | 8/2019 | Lang et al. | |

(Continued)

FOREIGN PATENT DOCUMENTS

WO WO-2018164701 A1 * 9/2018 ............. G06N 20/20

*Primary Examiner* — Mohammad W Reza
(74) *Attorney, Agent, or Firm* — Ashwin Anand; Lei Sun

(57) ABSTRACT

Systems and methods are provided to build a machine learned exploitability risk model that predicts, based on the characteristics of a set of machines, a normalized risk score quantifying the risk that the machines are exploitable by a set of attacks. To build the model, a training dataset is constructed by labeling characteristic data of a population of machines with exploitation test results obtained by simulating a set of attacks on the population. The model is trained using the training data to accurately predict a probability that a given set of machines is exploitable by the set of attacks. In embodiments, the model may be used to make quick assessments about how vulnerable a set of machines are to the set of attacks. In embodiments, the model may be used to compare the effectiveness of different remediation actions to protect against the set of attacks.

20 Claims, 12 Drawing Sheets

(56) References Cited

U.S. PATENT DOCUMENTS

| | | |
|---|---|---|
| 2019/0260768 A1 | 8/2019 | Mestha et al. |
| 2019/0312890 A1 | 10/2019 | Perilli |
| 2020/0067980 A1* | 2/2020 | Livny ................ H04L 63/1491 |
| 2021/0168166 A1* | 6/2021 | Liu ........................ G06N 20/00 |

* cited by examiner

DETECTED VULNERABILITY 800

EXPLOIT INFORMATION: *810*

EXPLOIT TYPE: XYZ Server – Remote Buffer Overflow (2)

DETECTION EVENT: Jan 5, 2020 2:33 pm (XYZ Risk Model)

ASSET: XYZ Server Fleet – Site A (122 nodes)

RISK SCORE: 0.88 (Detection Threshold 0.55)

[ SIMULATE *812* ]

REMEDIATION PLANS: *820*

| REMEDIATION PLANS 822 | RISK SCORE 824 | COST 826 | DOWNTIME 828 | RANK 830 |
|---|---|---|---|---|
| [A] Update Firewall Rules | 0.32 | 1 man hour(s) | | 2 |
| [B] Disable Request Type X | 0.15 | 20 man hour(s) | | 3 |
| [C] Apply XYZ Patch 4.4a | 0.00 | 120 man hour(s) | 1-2 days | |
| [A] and [B] | 0.05 | 20 man hour(s) | | 1 |
| [B] and [C] | 0.00 | 120 man hour(s) | 1-2 days | |

[ GENERATE WORKFLOW *832* ]

AUTOMATIC EVALUTION OF REMEDIATION PLANS USING EXPLOITABILITY RISK MODELING

BACKGROUND

Many companies operate private computer networks that are connected to public networks such as the Internet. While such connections allow its users to easily access resources on the public networks, they also expose the company network to potential cyberattacks. For example, company users may unwittingly download malicious content (e.g. data, files, applications, programs, etc.) onto the company network from the Internet. As another example, interactions between company users and outsiders on the public network may result in leaks of proprietary information to allow malicious actors to gain unauthorized access to the company network. Different types of cyberattacks can be used to achieve a variety of different ends, for example, to obtain sensitive information, gain control of the company's computing systems, or damage the company's resources. As a result, enterprise security management systems have become increasingly important to protect private company networks against these types of vulnerabilities.

Many enterprise security management systems provide some form of risk assessment functionality to quantify the risk of computing assets for cyberattacks. Existing processes for cybersecurity risk assessments are based primarily on human-defined formulas. However, human-defined formulas are subject to potential human biases (e.g., incorrect opinions or blindness about risk factors), which can be difficult to detect and eliminate. Moreover, quantitative results generated by these human-defined formulas tend to lack any real-world meaning, so they cannot be easily or intuitively understood by users. The produced risk scores are typically unnormalized and unbounded, so that it is impossible to meaningfully compare two generated risk scores. These issues with existing approaches for cybersecurity risk assessment negatively impact the accuracy of the assessments and limit the usefulness of these assessments. Better approaches are needed to generate risk scores that are more semantically meaningful and less impacted by human biases.

SUMMARY OF EMBODIMENTS

The systems and methods described herein may be employed in various combinations and in embodiments to implement a machine learned exploitability risk model that is trained to predict, based on the characteristics of a set of machines, a normalized risk score quantifying the risk that the machines are exploitable by a set of attacks. To build the model, a training dataset is constructed by labeling characteristic data of different groups of machines with exploitation test results obtained by simulating a set of attacks on the groups. The model is trained using the training data to accurately predict a probability that a given set of machines is exploitable by the set of attacks. In embodiments, the model may be used to make quick assessments about how vulnerable a set of previously unseen machines are to the set of attacks, without having to actually perform the simulation of attacks on the machines. In embodiments, the risk scores generated by the model may be used to compare the effectiveness of different combinations of remediation actions to protect against the set of attacks.

BRIEF DESCRIPTION OF THE DRAWINGS

FIG. 8 illustrates a graphical user interface (GUI) that provides details of a risk assessment generated using an exploitability risk model and a list of remediation plans selected using the exploitability risk model, according to some embodiments.

Figure 1:
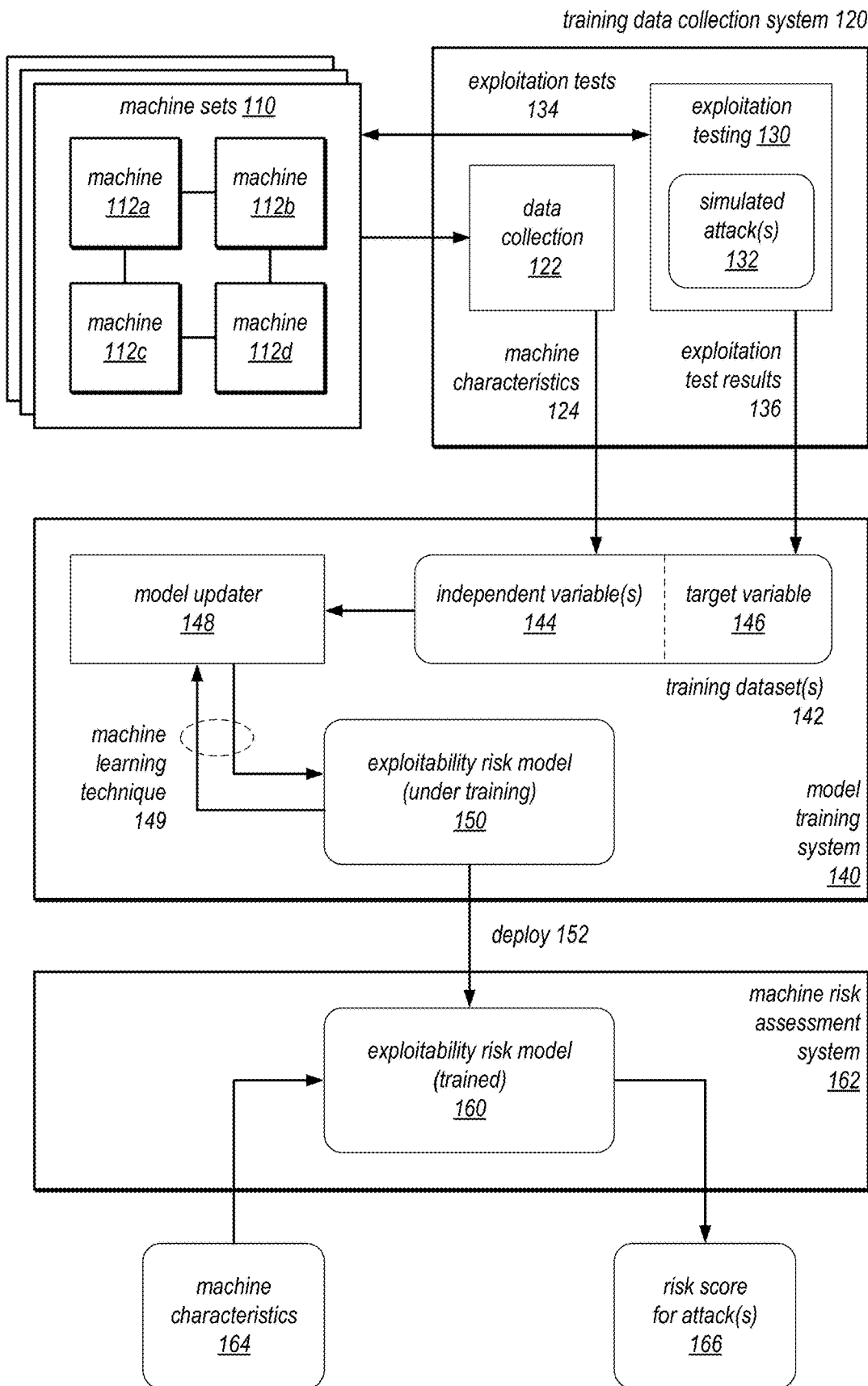
FIG. 1 is a block diagram illustrating a model training system that can be used to train an exploitability risk model to assess the risk of machines for cyberattacks, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

Many enterprise security management systems provide some form of risk assessment functionality to quantify the risk of computing assets for cyberattacks. Existing processes for cybersecurity risk assessments are based on manually defined formulas. However, the use of human-defined formulas presents a number of problems. For one thing, human-defined formulas are subject to potential human biases (e.g., incorrect opinions or blindness about risk factors), which can be difficult to detect and eliminate. Moreover, quantitative results generated by these formulas tend to lack any real-world meaning, so they cannot be easily or intuitively understood by users. The produced risk scores are typically unnormalized and unbounded, so that it is impossible to meaningfully compare two generated risk scores. These issues with existing approaches for cybersecurity risk assessment negatively impact the accuracy of the assessments and limit the usefulness of such assessments.

Accordingly, systems and methods are disclosed herein to determine the risk score using a data-driven approach, using a machine learned exploitability risk (ER) model. In some embodiments, the ER model may accept as input a set of machine characteristics about assets (e.g., hardware, software, configuration, usage, and environment data about a machine or group of machines), and produce as output a normalized risk score indicting how susceptible the assets are to a set of cyberattacks. In some embodiments, the ER model may be a logistic regression model that is trained to return a bounded risk score indicating a probability (0-100%) that the machine(s) can be exploited by the set of attacks.

In some embodiments, the ER model may be trained using a machine learning technique (e.g. via a form of supervised training), where the model is trained using a set of training data that are labeled with truth labels. Each observation record in the training dataset may include a set of independent variables representing the model's inputs and a set of target variables (the truth labels) representing the model's desired output(s). The model is then trained to accurately predict the truth label values based on the input features of the observation records.

Traditionally, truth data for risk modeling is difficult to obtain, because such data regarding cyberattacks is associated with rare or difficult-to-assess conditions and can vary depending on the particular use case. For example, the target variable of a risk model may be a binary indicator that indicates whether an asset has been compromised by a particular type of exploit, or can be compromised by a type of exploit (given sufficient data about the asset or a history of compromise). As may be understood, such data is rarely available and not willingly shared by most network operators.

To obtain truth data for the ER model, embodiments of the model training system disclosed herein will employ an exploitation testing system (e.g. the METASPLOIT penetration testing framework) to simulate attacks against assets. The results of the exploitation tests are used to populate the target variable. This target variable is then used to label training data records comprising the relevant input features of the machine(s) (e.g., a data profile of relevant characteristics of the machines). In some embodiments, the characteristics data and exploitation test results may be gathered in automated processes, for example, by a machine monitoring service.

Advantageously, by segregating human inputs from the risk model formulation, the disclosed approach minimizes the human bias typically present in formula-based risk assessment techniques. Moreover, the disclosed ER model outputs the exploitability risk as a probability value, which is intuitively easier to understand by human users. The risk score is also normalized so that it can be meaningfully compared with other model outputs.

In some embodiments, as the data evolves, the ER model can be updated using additional training. This sort of flexibility enables risk score calculations to adapt to changes in the cybersecurity landscape. For example, when a new zero-day exploit is discovered, new training data can be compiled to train the model to learn about the zero-day exploit, and risk scores can be dynamically re-calculated for assets to account for the zero-day exploit. Additionally, assuming that historical input data has been retained, an updated model can be run against the historical data to derive risk score assessments for points in the past. This type of analysis allows users to observe inter-temporal changes in the attack risk based on a consistent risk assessment model.

In some embodiments, the model training system may be accessible by individual network operators to create custom ER models. Different network operators may have different opinions about relevant input variables, useful target variables, and/or model hyperparameters. The model training system may provide a configuration interface to allow these operators to configure the model parameters to create custom ER models to suit their specific preferences.

In some embodiments, the ER model described herein may be used to evaluate the effectiveness of different remediation plans to guard against or respond to cyberattacks. When devising remediation plans, network operators may be constrained by a variety of real-world factors such as time, human resource capacity, the technical tools available, and other business considerations (e.g. the impact of an extended blackout period on business operations). In the face of these considerations, network operators must (1) rank the relative costs and effectiveness of different remediation plans, and (2) quantify the benefits and costs of the different plans in order to select or recommend a course of action.

By embracing a machine learning model driven approach to calculating cyberattack risk, a difference-in-difference method can be used to quickly quantify, using the ER model, the expected effects of different remediation actions, and then use this information to evaluate the relative security gains of various hypothetical courses of action. In some embodiments, the evaluations may be implemented by a remediation planning system, which may be configured to provide the evaluation results as operational guidance to simplify human decision-making or use the evaluation results to automate remediation actions.

In some embodiments, the remediation planning system may be configured to enumerate different permutations of remediation actions as potential remediation plans, and implement these plans to an instance of characteristics data for a set of machine(s) to generate additional instances of characteristics data. The plans are applied to the characteristics data only, without actually updating the set of machines. The additional instances of the characteristics data are then provided as input to a trained ER model to determine their respective risk scores for attacks. In this manner, the remediation planning system can simulate different remediation plans to quickly determine the relative effectiveness of the plans by comparing risk score reductions caused by each plan. In some embodiments, the remediation planning system may be configured to perform this analysis for permutations over hundreds or thousands of distinct remediation actions.

In some embodiments, the remediation planning system may associate a cost with each remediation action or action plan. The cost of a remediation action may reflect different types of cost factors such as the amount of work needed to carry out the action, a dollar amount associated with the action (e.g. an additional licensing cost), an amount of time needed to carry out the action, an functional or business impact on the machine(s) caused by the action, etc. These cost factors may be combined with the risk score reduction of individual remediation action plans to calculate a ranking metric for the plan (e.g. a security gain per unit of cost). The remediation planning system may then use the ranking metric to rank candidate remediation plans or recommend selected plans to the user. In this manner, the remediation planning system is able to use the ER model to programmatically determine remediation plans with the optimal balance of security gains and associated costs.

As will be appreciated by those skilled in the art, the disclosed methods and system to build and use the exploitability risk model provide numerous technical improvements to enhance the functioning of existing cyberattack risk access systems in the state of the art. These and other features and benefits of such methods and systems are described in further detail below, in connection with the figures.

FIG. 1 is a block diagram illustrating a model training system that can be used to train an exploitability risk model to assess the risk of machines for cyberattacks, according to some embodiments.

As shown, the figure depicts a model training system 140 that is used to train an exploitability risk model 150, using one or more training datasets 142. In this example, the training datasets 142 are built using a training data collection system 120. Depending on the embodiment, the training data collection system 120 may be implemented as part of the model training system 140, or a separate computer system. For example, portions of the training data collection system 120 may be implemented by a separate machine monitoring service that is configured to periodically collect data from the private networks of a large number of clients at different geographic locations.

As shown, the training data collection system 120 is configured to collect data from different machine sets 110. Each machine set 110 may include one or more machines 112a-d or assets, which may be connected in a network. In some embodiments, the machine sets 110 may be entire networks, and the types of cyberattacks modeled are designed to exploit different types of such networks. In some embodiments, a machine set 110 may include only one asset (e.g. a single server), and the modeled cyberattacks are designed to attack single machines.

As shown, the training data collection system 120 may implement a data collection component 122 and an exploitation testing component 130. In some embodiments, these two components may be implemented as two separate systems. The data collection component 122 is tasked with collecting machine characteristics data 124 from the different machine sets 110. The machine characteristics data 124 may include data about the machines that are relevant to cybersecurity assessments, such as the machines' hardware components, software components, data contents, configuration setting, operational states and metrics, event logs, and other information. The machine characteristics data 124 may also include the machine's environment metadata, including the type of network that individual machines belong to, various characteristics of the network (e.g. various gateway or firewall properties of the network), the number of nodes in the network, the amount of traffic received and produced by the network, and the type of company that owns or operates the network, etc. The machine characteristics data 124 may also include user metadata associated with the machines, including the type or role of users that have access to a machine, their access privileges, their frequency of accesses, their history of accesses, and the number of users that have access, etc. As may be appreciated by those skilled in the art, the collected data may include a wide variety of machine characteristics in addition to the types of data mentioned here.

In some embodiments, the training data collection system 120 may periodically collect such machine characteristics data 124 based on a schedule or change events and maintain a virtual representation of the machines 112 or machine sets 110 separately from the machine sets themselves. These virtual representations may be used by a variety of machine assessment or reporting processes, in addition to the process of creating training datasets for the model training system 140.

As shown, the exploitation testing component 130 may be tasked with performing exploitation tests 134 on the machine sets 110. In some embodiments, the exploitation testing component 130 may be a standalone penetration testing platform or framework, such as the METASPLOIT framework. Depending on the embodiments, other types of penetration testing systems such as NMAP, NETSPARKER, NESSUS, and WIRESHARK may also be used. In some embodiments, the exploitation testing component 130 may employ multiple types of penetration testing systems. The exploitation testing component 130 may provide a library of simulated attacks 132 to perform the exploitation tests 134. These simulated attacks may implement steps in known cyberattacks that have been made on computer systems. For example, one type of simulated attack may attempt to obtain the access credentials of a root user on a computer system. As another example, another simulated attack may attempt to infect a machine with a particular type of malware. In some embodiments, these simulated attacks can be performed programmatically, with little or no human involvement. The exploitation tests 134 may be initiated in response to human requests, or performed automatically, for example, according to a schedule or in response to changes or detected conditions in the machine sets 110. In some embodiments, the results 136 of the exploitation tests are stored in a test results repository or as part of the virtual machine representation of the machines 110.

As shown, the model training system 140 in this example will construct the training dataset 142 from the machine characteristics data 124 and the exploitation test results 136. The training dataset 142 will include a large number of observation records constituting "observations" about the machine sets 110. Each observation record may include a set of independent variables 144, which includes the machine characteristics data 124, and one or more target variables 146, which indicates the exploitation test results 136. In some embodiments, the exploitation test results 136 may be used as the truth label for each observation record to be used to train the ER model 150. In some embodiments, the target variable 146 may be a binary value indicating whether the machine set of that record was successfully exploited by the exploitation testing component 130 under a set of selected attacks. The model training system 140 may provide a configuration or feature engineering interface to allow users to specify what types of machine characteristics and exploitation tests to use to train the model 150.

The model training system 140 may implement a model updater 148, which may be configured to train the ER model 150 using one or more machine learning techniques 149. Depending on the embodiment, the ER model 150 may be implemented using a variety of different types of machine learning models, including decision tree models, neural networks, linear or logistic regression models, support vector machines, and the like. In some embodiments, the ER model 150 may include an ensemble of multiple models, possibly of different model types. The ER model 150 may be trained using a supervised training process. During this type of process, the observation records in training dataset 142 are labeled with known output (here the exploitation test results 136). The training data is then fed to the ER model 150 to generate predictions of the target variable 146 (here a probability of the exploitation test results). The model's predictions are compared against the truth labels of the training records, and the model's decision parameters are adjusted based on the accuracy of its prediction results. Over many iterations of the training process, the parameters of the model will be tuned to produce prediction results with a high degree of accuracy. In one implementation, a logistic regression model was trained in this manner to predict, given the characteristics of a machine set, the probability that the machine set can be successfully exploited by at least one attack in the set of attacks. In one implementation, the model training system 140 employed the SCIKIT-LEARN library for machine learning and code written in the PYTHON language to build the training datasets 142 and train the ER model 150. Depending on the embodiment, other types of machine learning tools and platforms such as TENSOR-FLOW, AMAZON SAGEMAKER, and AZURE ML STUDIO, or JUPYTER NOTEBOOK may also be used.

As shown, once the ER model 150 is sufficiently trained (e.g. when the model satisfies a model evaluation criterion based on an evaluate dataset), the ER model 150 will be deployed 152 to a machine risk assessment system 162. The machine risk assessment system 162 may be used to make risk assessment decisions for machine characteristics 164 collected from real-world machines. Using the trained ER Model 160, the machine risk assessment system 162 can quickly generate a risk score 166 to indicate the risk level that the machine set is exploitable by the set of attacks. Advantageously, the machine risk assessment system 162 is able to generate the risk score based on the machine characteristics data 164 alone, without having to actually perform exploitation tests on the machine set, which can be time consuming or even impossible in some cases. In some embodiments, the machine risk assessment system 162 may be configured to continuously monitor the risk score(s) of a set of machines. In some embodiments, if the risk score for the set of machines exceeds a configured threshold, an alert or notification may be generated to an administrator of those machines. An unacceptable risk score may also be used trigger certain automated actions, such as to sandbox the machines or to initiate actual exploitation tests against the machines to verify the model's determination. In some embodiments, the machine risk assessment system 162 may employ a cloud-based model hosting and management service such as GOOGLE CLOUD ML ENGINE or AMAZON SAGEMAKER.

Figure 2:
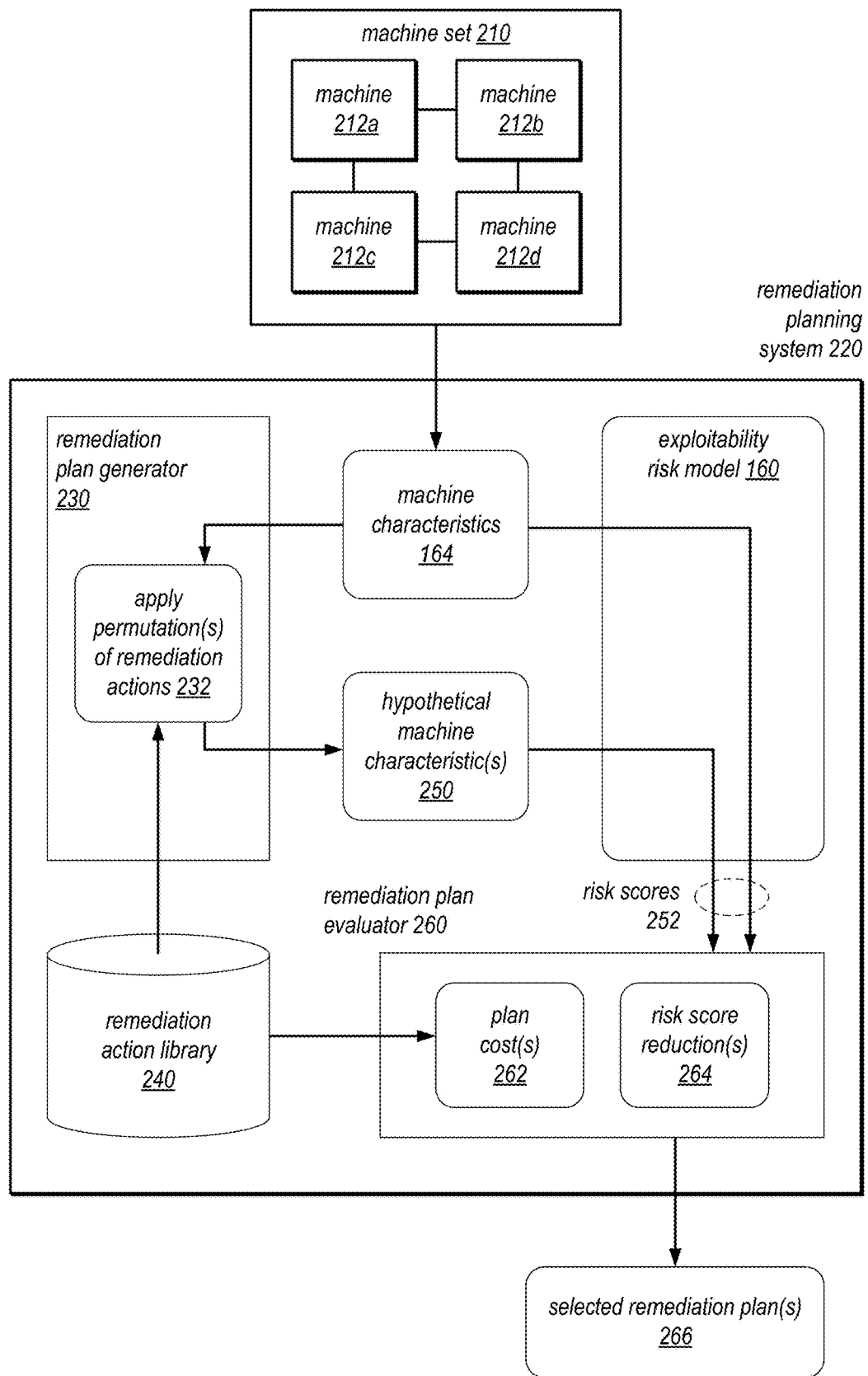
FIG. 2 is a block diagram illustrating a remediation planning system that uses an exploitability risk model to evaluate and generate remediation plans to guard against or respond to cyberattacks, according to some embodiments.

FIG. 2 is a block diagram illustrating a remediation planning system that uses an exploitability risk model to evaluate and generate remediation plans to guard against or respond to cyberattacks, according to some embodiments.

As shown in this figure, the trained ER model 160 is used as a part of a remediation planning system 220. The remediation planning system may be configured to programmatically generate, compare, evaluate, select, and/or recommend remediation plans for different types of cybersecurity vulnerabilities. For example, as a result of detection that a particular machine is susceptible to a zero-day attack, the remediation planning system may recommend a series of steps or remediation actions to prevent or mitigate such an attack (e.g. by adding certain firewall rules to detect signatures associated with the attack). As another example, after a phishing attack is detected, the remediation planning system may be configured to generate a remediation plan to identify and quarantine all emails that appear to be associated with the phishing attack. In some embodiments, the remediation planning system may be implemented as part of, or an adjunct to, the machine assessment system 162 of FIG. 1.

As shown in this example, the remediation planning system 220 may obtain machine characteristics data 164 from a machine set 210 of machines 212*a-d*, as discussed in connection with FIG. 1. The remediation planning system 220 implements a remediation plan generator 230, which is tasked with generating candidate remediation plans. As discussed, remediation plans may be generated in response to detected vulnerabilities in the machine set 210 or in response to an attempted or actual cyberattack. In some embodiments, remediation plans may be generated when the ER model 160 detects that the machine set 210 has an attack risk score that is above a particular threshold, or when a vulnerability is actually confirmed by an exploitation test.

To generate the remediation plans, the generator 230 may retrieve a number of remediation actions from a remediation action library 240. The remediation action library 240 may store different types of actions to take to protect against or mitigate different types of cyberattacks. Some of the remediation actions may alter the profile of the machine set 210 as reflected in the machine characteristics data 164. The remediation action library 240 may also store other details of the remediation actions, such as various details for carrying out individual actions and different types of costs of individual actions. For example, the library 240 may store metadata about each action that indicates how long it takes to implement the action, the number of man-hours needed to perform the action, any business impacts or restrictions associated with the action, among other things.

As shown, the remediation planner 230 may obtain a set of remediation actions that are relevant to a particular detected vulnerability or cyberattack, and generate multiple permutations of the actions as candidate remediation plans. The remediation planner then applies 232 the candidate plans to the machine characteristics data 164 to generate additional instances of hypothetical machine characteristics data 250. For example, if a particular remediation plan involves the installation of a patch to the machines 212*a-d*, a hypothetical instance of the machine characteristics data 250 is generated to reflect the installation of the patch. The hypothetical machine characteristics data 250 is generated without actually performing the remediation plans on the machine set 210.

As shown, once the hypothetical machine characteristics data 250 are generated, they are provided as input to the ER model 160 to determine their respective risk scores 252. As discussed, the ER model 160 has been trained to generate exploitability risk scores for the particular set of attacks. The generated risk scores of the hypothetical machine characteristics are then provided to a remediation plan evaluator 260.

As shown, the remediation plan evaluator 260 is configured to compute risk score reductions 264 caused by each candidate remediation plan (i.e. each individual permutation of the remediation actions produced by the plan generator 230). The plan evaluator 230 may determine the risk score reduction by comparing the risk score of an instance of a hypothetical machine characteristics 250 to the initial risk score of machine set. The risk score reductions 264 are used to perform a quantitative comparison of the effectiveness of the different remediation plans.

In some embodiments, the comparison of remediation plans may also take into account the different costs 262 of the plans. The plan costs 262 may be computed according to defined formulas, and based on the costs of individual remediation actions stored in the remediation action library 240. In some embodiments, the plan costs 262 may be calculated by the remediation plan generator 230 and provided by the generator 230 to the remediation plan evaluator 260. In some embodiments, the cost of a remediation plan may be combined with the risk score reduction of the plan to determine a rank metric for that plan. For example, the risk score reduction may be divided by a normalized plan cost to determine security gain per unit of cost measure of each plan. The rank metric may be used to compare, rank, and/or select the best remediations plans for the detected vulnerability.

As shown, the remediation planning system 220 outputs a selection of the best remediation plans 266, which is determined based on the risk score reductions or rank metrics, as discussed. In some embodiments, the selected remediation plans 266 may indicate a single best plan determined by the planning system. In some embodiments, the planning system may provide a ranked list of remediation plans, ranked according to the rank metric. In some embodiments, the planning system may explicitly provide risk score reductions and costs of the selected plans 266. The selected remediation plans 262 may be provided as recommendations via a graphical user interface (GUI). In some embodiments, a selected plan may automatically trigger certain actions, such as the creation of a ticket to implement the plan or the generation of an execution workflow for the plan.

Figure 3:
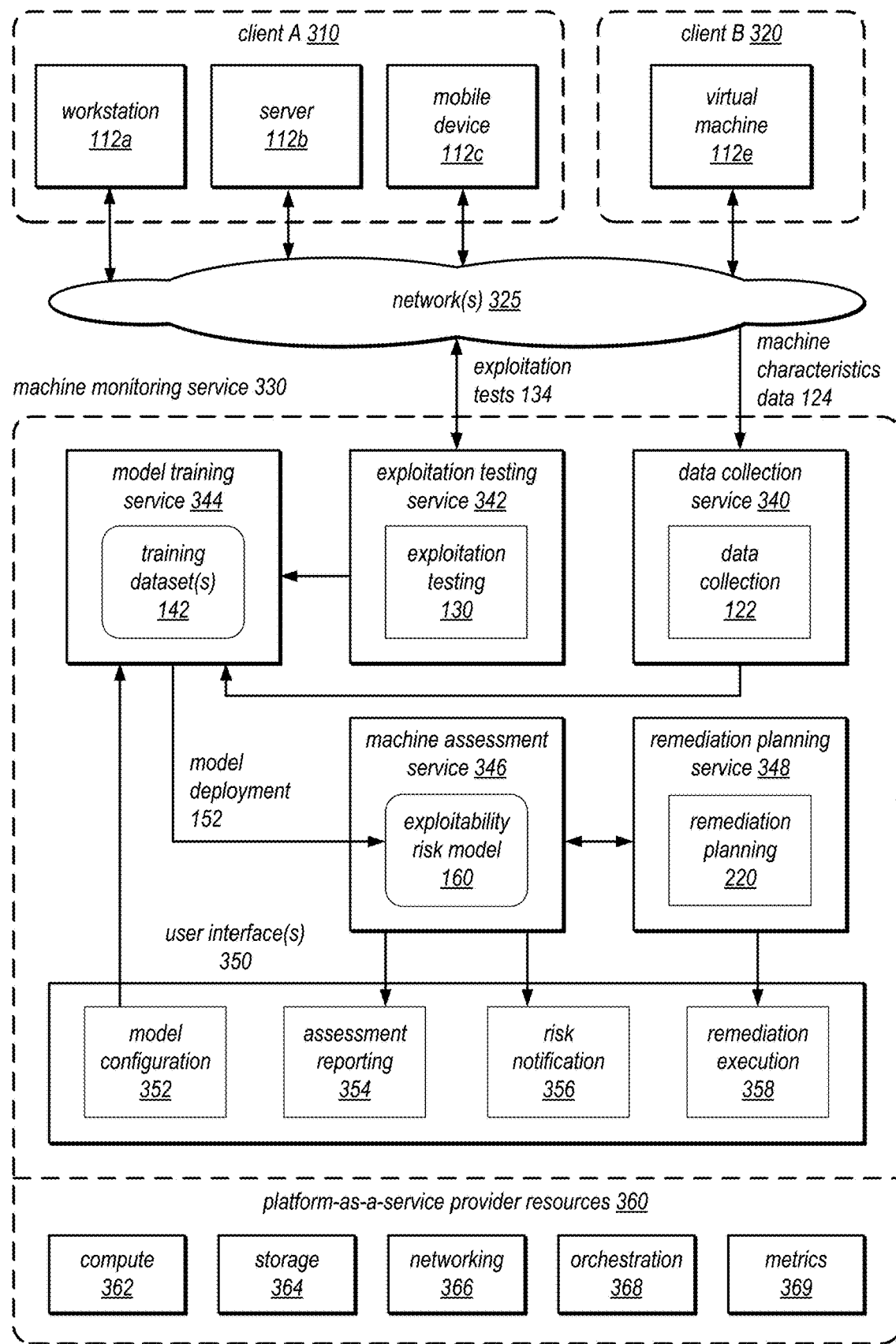
FIG. 3 is a block diagram illustrating a machine monitoring service implemented by a platform-as-a-service provider network that uses an exploitability risk model to assess the risk of machines for cyberattacks and generate remediation plans for cyberattacks, according to some embodiments.

FIG. 3 is a block diagram illustrating a machine monitoring service implemented by a platform-as-a-service provider network that uses an exploitability risk model to assess the risk of machines for cyberattacks and generate remediation plans for cyberattacks, according to some embodiments.

As shown in the figure, a machine monitoring service 330 is implemented using a platform-as-a-service (PaaS) provider network. The machine monitoring service 330 may be operated by a provider company to provide a number of cloud-based client-facing services 340, 342, 344, 346, and 348 to various clients. The client networks 310 and 320 may be operated by different groups, organizations, companies, or other types of entities that are customers of the machine monitoring service 330. In some embodiments, different clients may be associated with different user accounts of the machine monitoring service 330.

In various embodiments, the network(s) 325 may encompass any suitable combination of networking hardware and protocols necessary to establish communications between the client networks 310 and 320 and the machine monitoring service 330. In some embodiments, the machines 112 may execute in a private network of a company, behind a company firewall, and the network 325 may include a public network such as the Internet, which lies outside the firewall. The network 325 may encompass the different telecommunications networks and service providers that collectively implement the Internet. In some embodiments, the network 325 may also include private networks such as private local area networks (LANs), private wide area networks (WANs), or private wireless networks. The network 325 may be implemented using different hardware (e.g., modems, routers, switches, load balancers, proxy servers, etc.) and software (e.g., protocol stacks, accounting software, firewall/ security software, etc.) for establishing networking links between the client networks 310 and 320 and the machine monitoring service 330.

As shown, the client networks 310 and 320 may include different types of computing resources, such as a workstation 112a, a server 112b, a mobile device 112c, and a virtual machine 112e. Each of these types of machines may be included in the machine set 110 of FIG. 1 or machine set 210 of FIG. 2. The virtual machine 112e is an instance of an emulated computer or execution environment that is hosted on a physical virtual machine host. The virtual machine host may implement virtualization hardware and/or software (e.g. hypervisors) to execute and manage multiple instances of guest operating systems. Example implementations of such virtualization technologies include VMWARE ESX/ESXI, MICROSOFT HYPERV, AMAZON WEB SERVICES, and MICROSOFT AZURE. Another type of virtual machine is the container, which provides a portable and isolated execution environment over a host operating system of a physical host. Example implementations of container technologies include DOCKER, GOOGLE KUBERNETES, AMAZON WEB SERVICES, and MICROSOFT AZURE. As may be appreciated, the machines 112 may include a variety of other types of computing systems, including embedded systems, networking devices, storage devices, Internet-of-Things (IoT) devices, vehicles, and the like.

As shown, the machine monitoring service 330 may implement a data collection service 340, which implements the data collection component 122 of FIG. 1. In some embodiments, the data collection service 340 may be configured to collect specified machine characteristics data 124 about the assets operated by a large number of clients. The collections may be performed using different means, such as software collection agents on the machines 112, specialized data collection appliances located in the client private networks 310 and 320, or network scanners operated as part of the machine monitoring service 330. In some embodiments, the data collections may be controlled via configuration information specified by the administrators of the clients. The collections may occur periodically according to a set schedule, or based on certain specified events (e.g. in response to changes in the client network). In some embodiments, the collected data 124 may be used to maintain an up-to-date virtual representation of the machines 112 or entire client networks, which is used by the machine monitoring service 330 to perform a variety of assessments of client assets.

As shown, the machine monitoring service 330 may implement an exploitation testing service 342, which implements the exploitation testing component 130 of FIG. 1. In some embodiments, the exploitation testing service may be implemented using a penetration testing framework that provides penetration test modules to simulate known types of cyberattacks. Such penetration testing frameworks may include penetration testing platforms such as METASPLOIT, NMAP, NETSPARKER, NESSUS, and WIRESHARK, among others. In some embodiments, certain exploitation tests may be performed in an automated fashion, for example, on periodically or on an event-driven basis. For example, some clients may require that exploitation tests be performed when the risk scores produced by the ER model 160 exceeds a set threshold, in order to verify the model's predictions. In some embodiments, new exploitation tests are performed on assets when new cyberattacks are discovered and an exploitation test module for the attack becomes available. In some embodiments, exploitation tests may be performed in a pseudo-random fashion on assets of different clients.

In some embodiments, the results obtained by the data collection service 340 and exploitation testing service 342 may be added to a machine demographic data repository, which stores anonymized demographic data about a wide variety of machines and client networks. Such demographic data may indicate the things such as the prevalence of certain machine characteristics (e.g. types of operating systems, applications, etc.) in the population of machines, and also the incidences or prevalence of different types of cyberattacks.

As shown, the machine monitoring service 330 may implement a model training service 344, which may be used to implement the model training system 140 of FIG. 1. As shown in this example, the machine characteristics data 124 and exploitation test results 136 are provided to the model training service 344 to construct the training datasets 142 for the ER model. In some embodiments, the model training service 344 may implement an ongoing retraining of the ER model by collecting new observation records that are likely to improve model performance. For example, the model training service may be configured to prefer observation records about a particular type of machine that is very common in the wild (e.g. machines that implement a particular software stack). In some embodiments, the model training service 344 may be configured to recommend or initiate exploitation tests on machine types of particular interest. In some embodiments, a vulnerability discovered on one type of machine may cause the model training service 344 to collect observation data from similar machines of the same type. The new training data is then used to perform additional training on the ER model (or to construct a new version of the model) to improve the model's performance or keep the model up-to-date with the changing characteristics within the machine population.

In some embodiments, the model training service 344 may provide a client-facing interface (e.g. model configuration interface 352) to individual clients to allow the clients to develop their own specific ER models. For example, the model training service 344 may allow a particular client to specify the input features and model parameters of a custom ER model, which may be trained using only data collected from that client. In some embodiments, the model training service 344 may be configured to train a suite of specialized ER models for specific types of machines and specific types of attacks. These models may then be used to quickly check the assets for different types of risks specific to a type of asset or a type of attack.

As shown, the machine monitoring service 330 may implement a machine assessment service 346, which may be used to implement the machine risk assessment system 162 of FIG. 1. The model training service 344 may periodically deploy 152 trained versions of the ER model 160 to the machine assessment service 346. The machine assessment service 346 may be configured to perform a variety of assessments to client assets being monitored and generate assessment reports via the assessment reporting interface 354. Vulnerability assessments of assets may be conducted by an assessment orchestrator, which may invoke various jobs to make assessment on a virtual representation of the assets maintained at the machine monitoring service 330. Using the ER model 160, the assessments may identify various security vulnerabilities of the machines based on the collected machine characteristics. In some embodiments, the machine assessment service 346 may observe and track the risk scores of the monitored assets over time, and alert the administrator (e.g. via the risk notification interface 356) when the risk score exceeds a certain level or exhibits a problematic trend.

As shown, the machine monitoring service 330 may implement a remediation planning service 348, which may be used to implement the remediation planning system 220 of FIG. 2. As discussed, the remediation planning system 330 may be configured to generate, evaluate, compare, and/or recommend remediation plans to mitigate detected cyberattack risks or respond to actual cyberattacks. As shown, the remediation planning service 348 may use the machine assessment service 346 to perform remediation planning, for example, to obtain risk scores of various hypothetical machine profiles generated by the planning service. In some embodiments, the remediation planning service may be triggered whenever a particular risk score produced by the ER model 160 exceeds a threshold. In some embodiments, the remediation planning service 348 may provide is selected remediation plans via a user interface 350. The recommended remediation plans may be provided in a ranked list, sorted by a rank metric that takes into account the risk reduction provided by the plan and the cost of the plan. In some embodiments, the remediation planning service 348 may also generate a workflow for a recommended or user-selected remediation plan and provide the workflow via a remediation execution service 358. The generated workflow may be associated with an incident ticket and provide the steps to allow network security personnel to carry out the plan. In some embodiments, the remediation planning service 348 may be configured to interface with many third party software systems to generate the remediation plans and the plan workflow.

As shown, the machine monitoring service 330 may also implement a user interface 350, which provides the interfaces 352, 354, 356, and 358, as discussed. The user interface 350 may be a web-based interface that is accessible via a web browser. The user interface may be a graphical or command line user interface. In some embodiments, the user interface may also include real-time notification interfaces such as email or text interfaces. In some embodiments, the user interfaces 350 may be implemented as part of a user console to allow users to configure various aspects of the machine monitoring service 330, receive assessments reports, and carry out remediation actions. In some embodiments, the user interface 350 will allow users to specify how the ER model should be built and the frequency and/or conditions under which the ER model should be updated.

As a whole, the machine monitoring service 330 may be implemented as a number of web services that receive web services requests formatted as JSON documents. The machine monitoring service 330 may support REST-style or document-based (e.g., SOAP-based) types of web services requests. In some embodiments, the machine monitoring service 330 may implement service interfaces using other types of remote procedure calling protocols, such as GOOGLE PROTOCOL BUFFERS or PROTOBUF. The PaaS provider network may provide hardware and/or software to implement service endpoints, such that a request directed to that endpoint is properly received and processed.

As shown, the PaaS provider network may provide different types of computing resources 360 for the machine monitoring service 330, which can be leased by the operator of the machine monitoring service 330. The PaaS provider may provide resource services such as compute resource service 362, storage resource service 364, networking resources service 366, orchestration service 368, and resource metrics service 369. The services of the machine monitoring service 330 may be built using these underlying resource services provided by the PaaS provider. In some embodiments, the PaaS resources 360 may implement features such as load balancing of incoming service requests and/or dynamic management and scaling of service node pools. In some embodiments, each of the services 340, 342, 344, 346, and 348 may be implemented using a pool of service nodes provided by the PaaS provider, which may be individual instances of virtual machines. In some embodiments, the PaaS provider may be a provider such as AMAZON WEB SERVICES or MICROSOFT AZURE.

Figure 4:
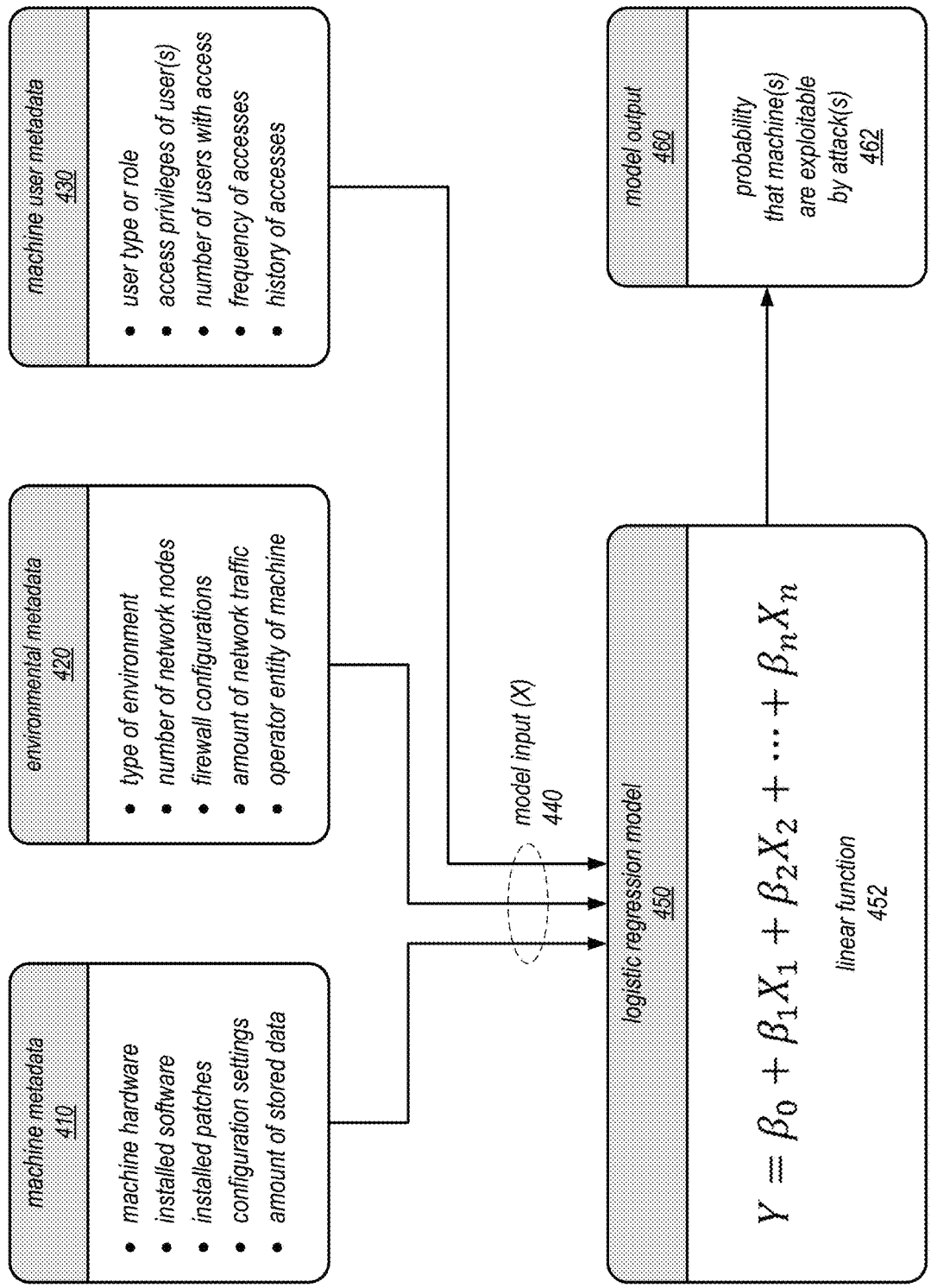
FIG. 4 illustrates example input and output of an exploitability risk model, according to some embodiments.

FIG. 4 illustrates example input and output of an exploitability risk model, according to some embodiments. In this example, the exploitability risk model is a logistic regression model. The logistic regression model 450 shown in the figure may be an embodiment of the ER model 150 or 160 of FIG. 1. However, in other embodiments, other types of machine learning models such as decision tree models, neural networks, support vector machines, etc., may also be used.

The logistic regression model 450 in this example models the exploitation risk of a machine or group of machines based on an inner function 452. In this example, the inner function is a linear function that combines the components $X_1, X_2, \ldots X_n$ of and input vector X 440 to generate a target variable Y. The input variables $X_1, X_2, \ldots X_n$ represent different characteristics of a given set of machine(s), and the target variable Y is a binary value (0 or 1) that indicates whether a given set of machines is exploitable by the set of attacks. The logistic regression model 450 will be trained to tune weight coefficients $\beta_0, \approx_1, \beta_2, \ldots \beta_n$ based on the training data to accurately predict the probability that Y=1 (i.e. the given set of machines is exploitable). In a logistic regression model, the linear function 452 may be trained to produce the log odds (or probit) of a particular outcome of the binary classification (Y=1) based on the input features X. The coefficients may be tuned using a parameter tuning algorithm such as expectation maximization or gradient descent. With sufficient training, the logistic regression model 450 can be tuned to produce a model output 460 that indicates a fairly accurate probability 462 of whether the given machine(s) is exploitable by the set of attacks being modeled. Because the output of the model 460 is a probability value, it is bounded between 0 and 1 and normalized for different types of asset types and asset group sizes. Accordingly, the model output 460 can be meaningfully compared for different configuration settings of an asset, or different groups of assets of different sizes. As discussed, the logistic regression model shown here is just one example type of model that may be used to implement the exploitability risk model. Other types of machine learning models may also be used, depending on the embodiment.

The figure also illustrates a few different types of data that can be used as the model input 440. One type of model input may include different types of machine metadata 410. Such machine metadata 410 may indicate various hardware, software, configuration, and operational characteristics of a particular machine or group of machines. For example, this type of metadata may indicate the hardware on a particular machine (e.g. the number of network interface cards that exist on the machine, or whether a trusted platform module (TPM) is tied to the machine), the installed software (e.g. the operating system and any virus scanners) of the machine, any installed patches on the machine, particular configuration setting on the machine (e.g. whether password protection or SSH is enabled), and the amount of data stored on the machine.

Another type of model input data includes environmental metadata about the machine(s). Such metadata 420 may include data such as the type of environment or network that the machine(s) resides in (e.g. whether the network is open to the public), the number of nodes in the network, the firewall rules configured for the network, the amount of traffic received or sent by the network, and the entity (e.g. the company or organization) that owns or operations the machine(s).

Another type of model input data includes machine user metadata 430. Such metadata 430 may include information about users associated with the machine(s), such as the type or role of the user with access to the machine, the access privileges of individual users (e.g. whether the user has administrator privileges), the number of users with access to the machine, the frequency of accesses of the machine, and the history of access of the machine.

As will be appreciated by those skilled in the art, the types of input data shown here are merely examples. A variety of other types of data may be used as input to the RE model to determine the exploitability risk score, without departing from the spirit of the inventions disclosed herein.

Figure 5:
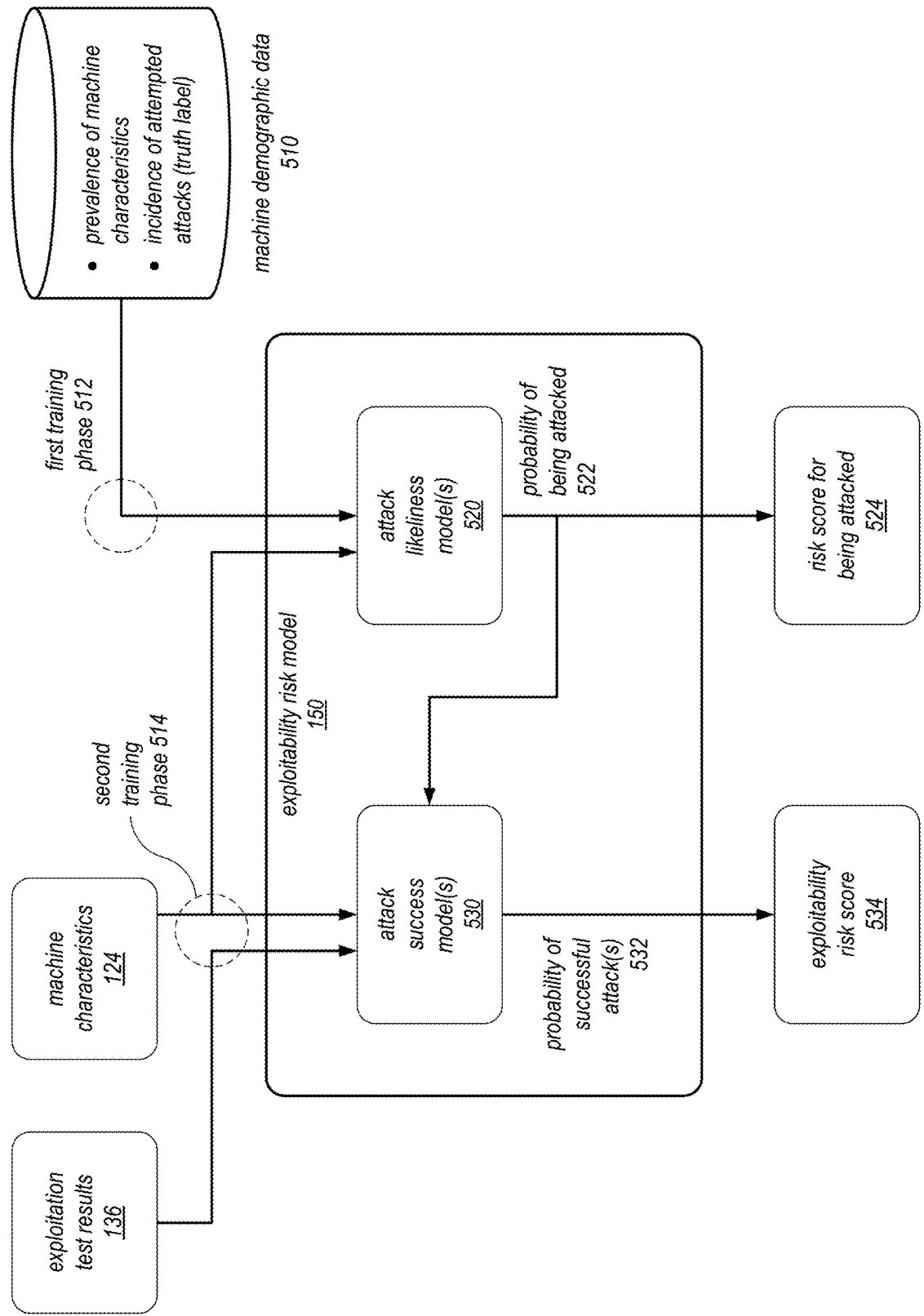
FIG. 5 illustrates an exploitability risk model that is trained using machine demographics data, according to some embodiments.

FIG. 5 illustrates an exploitability risk model that is trained using machine demographics data, according to some embodiments. The process illustrated in this figure may be performed by an embodiment of the model training system 140, as discussed in connection with FIG. 1.

In this illustrated embodiment, the ER model under training 150 comprises two sub-models 520 and 530, which are trained to produce to internal model outputs 525 and 535, respectively. The attack likeliness model 520 is trained in a first training phase 512 to predict a probability of being attacked 522, or some other indicator of attack likeliness. For example, the output 522 may indicate that, for a machine with a particular combination of machine characteristics (e.g. a WINDOWS machine that uses a particular version of Server Message Block (SMB) protocol), that machine is more likely to be attack by particular types of attacks (e.g. the TrickBot malware, which is designed to exploit SMB vulnerabilities). In some embodiments, the ER model 150 may be configured to provide this internal output as an explicit output, for example, as a normalized risk score 524 of the machine for being targeted for this type of attack.

As shown, the sub-model 520 is trained to produce this output 522 based on machine demographic data 510. The machine demographic data 510 may be obtained from a repository, which stores information about the prevalence of particular types of machine characteristics, and incidence or prevalence of attempted attacks. In some embodiments, this type of demographic information may be available to a third-party machine monitoring service (e.g. the machine monitoring service 330 of FIG. 3) that is monitoring the assets of many different clients. Such monitoring services may be able to capture the demographic data 510 in anonymized form and use this data to train its ER models. For example, the demographic data 510 may be used to construct training datasets where the incidence of attempted attacks are used as target variables or truth labels. These training datasets may then be used by the training system to tune the sub-model 520 to recognize the profiles of machines that are attractive to those types of attacks.

Once the attack likeliness model 520 is sufficiently trained, the attack success model 530 may be trained in a second training phase 514, where the model parameters of the attack likeliness model 520 remain fixed. As shown, the attack success model 530 may be trained using the exploitation test results 136, which are used as the truth labels in this second phase as discussed. Additionally, as shown, the output 522 of the attack likeliness model 520 is also used as an input to the attack success model 530. Thus, the "attractiveness" of a machine for a particular type of attack is seen as another machine characteristic by the attack success model 530. Importantly, it is recognized that there is some degree of relationship between the attractiveness indicator and the likelihood of success by an attack. That is, a machine that is frequently targeted by a particular type of attack is also likely to be vulnerable to that type of attack. By training the ER model 150 in this manner, the ER model is able to recognize this relationship and take this information into account to produce the probability of success by the attack 532. As shown, the output 532 may be used to generate the output risk score 534. It is noted that although the training process in this example is described to occur in two separate phases, in some embodiments, the two sub-models 520 and 530 may be trained together in a single phase, or in a different order.

Figure 6:
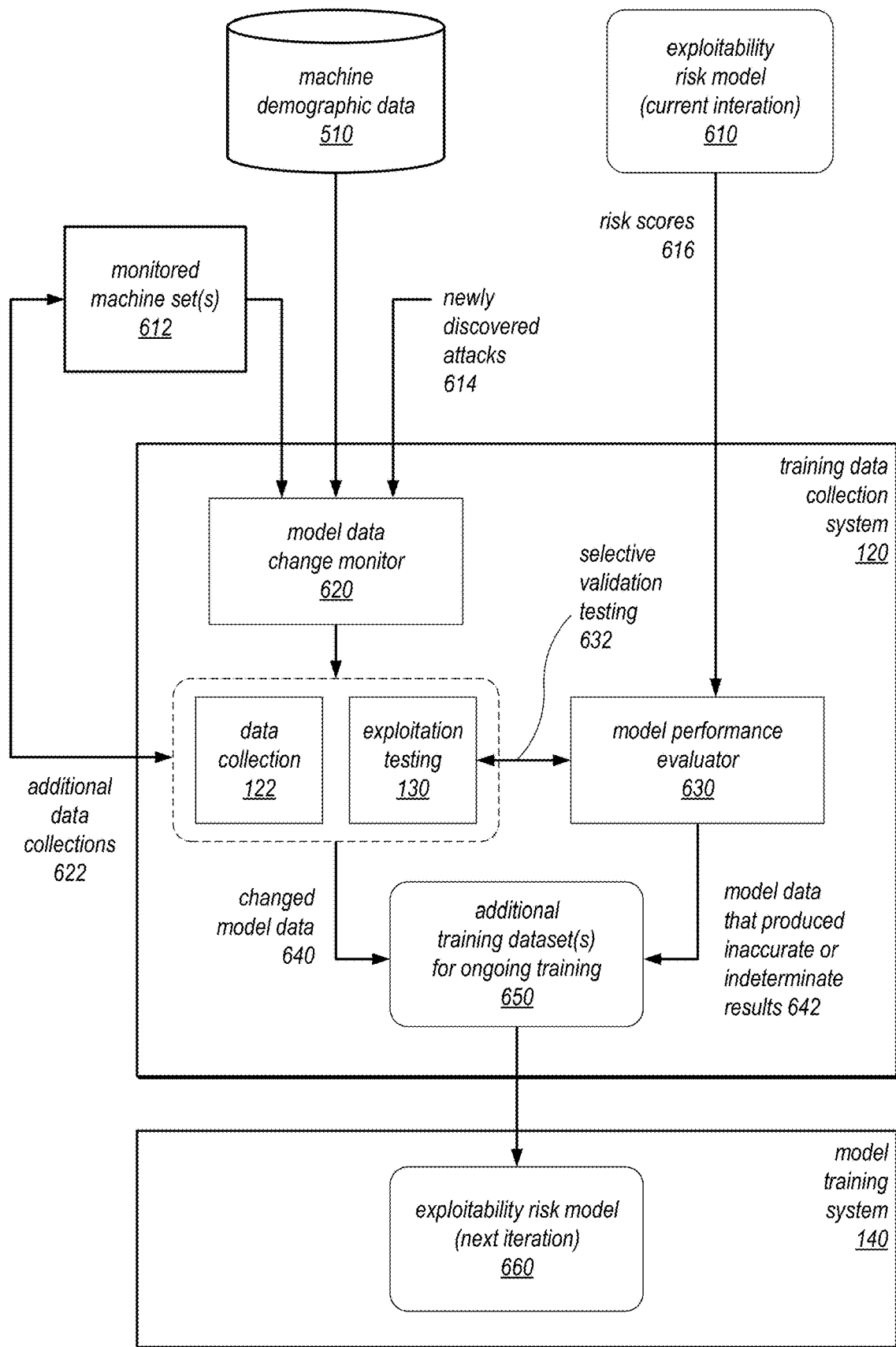
FIG. 6 illustrates an example process of collecting additional training data for ongoing training of an exploitability risk model, according to some embodiments.

FIG. 6 illustrates an example process of collecting additional training data for ongoing training of an exploitability risk model, according to some embodiments.

In this example, the training data collection system 120 is configured to compile additional training datasets 650 to be used for ongoing training of the ER model. In some embodiments, the ER model may be continuously updated to produce successive iterations or versions of the model (e.g. model iteration 660), which will be successively redeployed to replace the current version of the model (model iteration 610). In this manner, the ER model may be evolved over time to keep up-to-date with the changing nature of model data, so that its output can remain accurate over time. Model retraining may be initiated on a periodic basis, based on the occurrence of events (e.g. discovery of new types of attacks), or when a sufficient amount of additional training data 650 has been accumulated.

As shown, the training data collection system 120 in this example uses two types of model data to create the additional training datasets 650. First, the training data collection system 120 is configured to scan for changed or new model data from various sources to create new training data. Second, the training data collection system is configured to perform periodic validation testing 632 to evaluate model performance, and any observation data that caused the model to generate an inaccurate result will be added to the additional training data.

To collect changed model data, the training data collection system may implement a model data change monitor 620, which may be configured to receive changed model data from different sources. Change model data may include changed machine characteristics data detected for a set of monitored machine sets 612. In some embodiments, the training data collection system may continuously resample characteristics data from monitored machine sets, and when a desired machine profile is detected, exploitation tests may be run against that machine profile to generate new training data. As shown, another source of changed model data may come from the machine demographics data 510. In some embodiments, the machine demographics data change slowly overtime, and the data change monitor 620 may be configured to periodically check for significant changes in the demographics data repository 510. As shown, another type of changed model data may include newly discovered attacks 614. New attacks may be learned from publicly available data repositories, which may also be monitored. In some embodiments, a newly discovered attack may be accompanied by a corresponding exploitation test module, which can be used to perform additional exploitation testing to generate new training data. As shown, whenever change model data is detected, the training data collection system 120 may use the data collection component 122 or exploitation testing component 130 to perform additional data collections 622 to create new observation records of changed model data 640, which are then added to the additional training datasets 650.

To collect model data that produced inaccurate prediction results (i.e. inaccurate risk scores 616), the training data collection system may implement a model performance evaluator 630. The model performance evaluator 630 may examine the risk scores 616 produced by the ER model 610, and use the exploitation testing component 130 to perform selective validation testing 632 of the machine sets that produced the risk scores. In some embodiments, risk scores 616 that are above a certain threshold will be validated by actual exploitation testing. In some embodiments, selection for validation testing may be based on how common (or useful) the machine characteristics of the associated machine(s) are. In some embodiments, risk scores 616 that are indeterminate (e.g. shows an exploitability probability that is close to 50%) may be selected for validation. In some embodiments, the selection criteria for validation testing may be configurable via a user interface, such as the model configuration interface 352 of FIG. 3. When the exploitation test results are obtained, if the results indicate that the machine set represents an interesting observation (e.g. because the model-predicted risk score was inaccurate or indeterminate), a training data record will be generated for that observation and added to the training dataset 650. In this manner, the ER model can be retrained to gradually improve its performance based on new experience with actual data.

Figure 7:
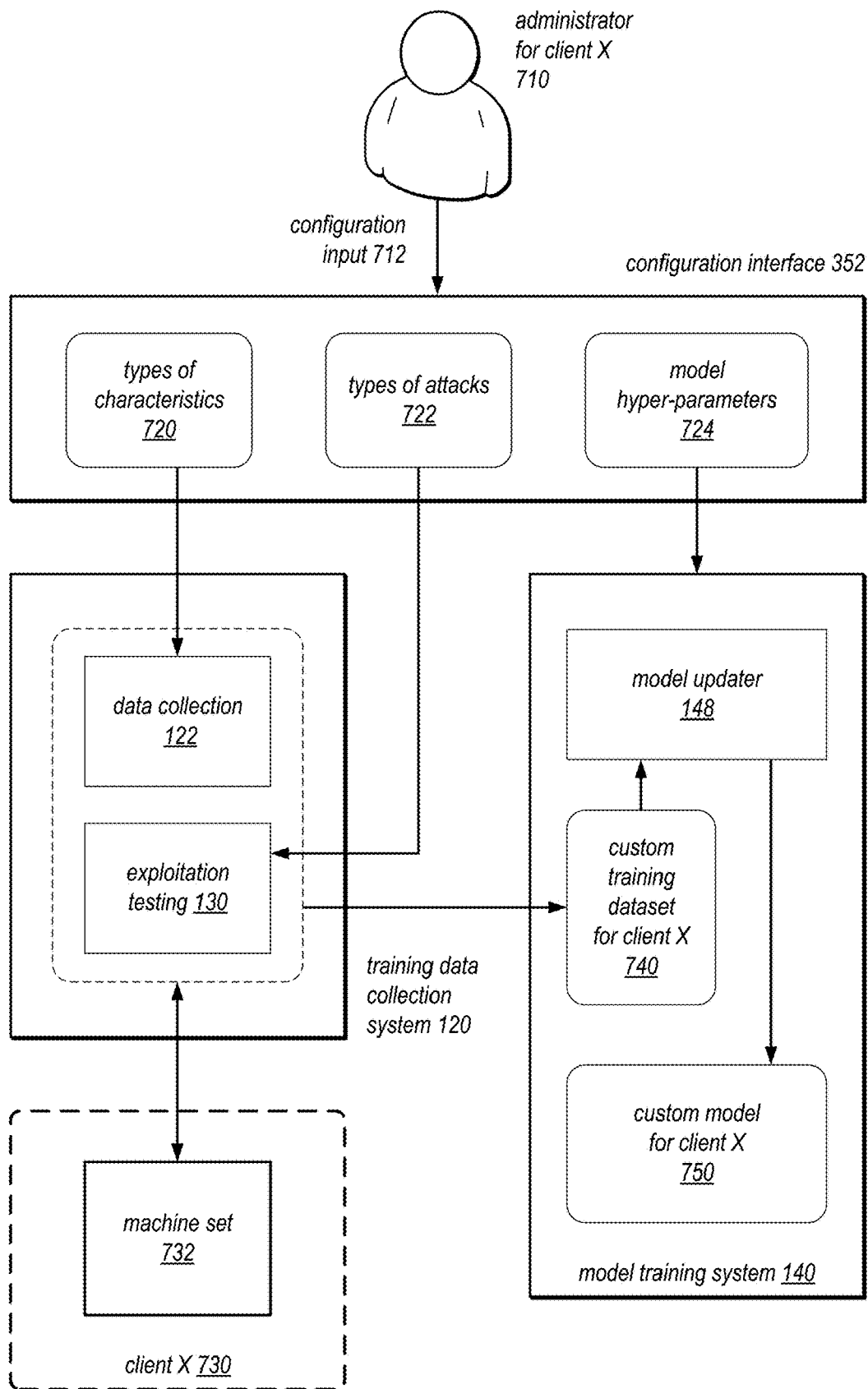
FIG. 7 illustrates an example system to configure and create a custom exploitability risk model for a specific client, according to some embodiments.

FIG. 7 illustrates an example system to configure and create a custom exploitability risk model for a specific client, according to some embodiments.

As shown in this example, an administrator 710 for a particular client X is configuring 712 various model parameters via the configuration interface 352 for a custom ER model 750 that is specific to that client. The client may be a client of a monitoring service such as the machine monitoring service 330 of FIG. 3. As shown, client X 730 operates a computing environment that includes a machine set 732 of client machines.

As shown, the administrator may configure various parameters of the custom ER model 750, including the machine characteristics 720 used as input by the model and the types of attacks 722 whose risks are to be predicted by the model. For example, the user 710 may select a particular set of machine characteristics to use that is specific to that client. The configured machine characteristics 720 may control the behavior of the data collection component 122, and the configured types of attacks may control the behavior of the exploitation testing component 130. In some embodiments, the user 710 may also select custom output variables to be generated by the model, such as the risk scores 524 or 534 of FIG. 5. In some embodiments, the configuration input may indicate whether risk scores are to be generated for groups of machines or individual machines or whether risk scores are to be generated for individual types of attacks or an entire group of attacks, among other configuration settings. As shown, in this example, the custom model 750 will be built using custom training data 740 that are collected from the machines 732 of that particular client X. Thus, the resulting model 750 will be specifically adapted to generate risk scores for only those machines.

As shown, another type of configuration that could be made through the configuration interface 352 is model hyperparameters 724. In some embodiments, such hyperparameters may adjusted be outside of the machine learning process. For example, model hyperparameters may dictate how many different instances of decision trees is to be used in a random forest model, how many layers will be used by a neural network, any regularization parameters to be used during training, particular interpretive thresholds used to translate the model's output into interpreted results, etc. In some embodiments, the configuration interface 352 may also allow users to specify the scope of the data collection, for example, whether certain machines in the machine set are to be included, how often to collect training data, how to filter or sample the training data, etc.

In some embodiments, custom models such as ER model 750 may be developed for not just particular clients, but particular types of machines, attacks, or environmental factors. For example, a custom ER model may be created for LINUX machines that are used as web servers. As another example, a custom ER model may be created for all types of Distributed Denial of Service (DDoS) attacks. As yet another example, another custom ER model may be created for an inventory of company phones issued to employees. In some embodiments, all such models may be maintained and managed by a model execution system such as the machine risk assessment system 162 of FIG. 1. In some embodiments, all of these custom models may be updated with new training data over time, as discussed in connection with FIG. 6.

FIG. 8 illustrates a graphical user interface (GUI) that provides details of a risk assessment generated using an exploitability risk model and a list of remediation plans selected using the exploitability risk model, according to some embodiments.

As shown, the GUI 800 in this example shows a vulnerability that was detected for an asset. The asset in this example is a fleet of servers, which may be monitored by a service such as the machine monitoring service 330 of FIG. 3. The GUI 800 may be implemented as part of the assessment reporting interface 354 or risk notification interface 356 of FIG. 3. As discussed, the detection of the vulnerability may be made using the characteristics data of the XYZ server fleet alone, using a trained ER model and without performing actual exploitation testing of the server fleet. In some embodiments, the machine monitoring services may continuously monitor the risk score(s) for the machines for different types of attacks, and notify the user when the risk score exceeds a specified threshold.

In this example, the GUI 800 provides an exploit information section 810 about the detected vulnerability. The exploit in this case is a type of Remote Buffer Overflow attack. In the GUI 800, the bolded underlined information indicates hyperlinked fields that may be clicked to navigate to additional information about the information. For example, the user may click on the Remote Buffer Overflow exploit type to learn more information about the attack. Additionally, the section 810 also includes a simulation button 812. The simulate button 812 may allow the user to launch an exploitation test system (e.g. exploitation testing system 130) to perform a manual test to simulate the attack.

As shown, section 810 also indicates detection event associated with the detected vulnerability. In this case, the event information indicates the time of detection and the ER model that was used to trigger the detection. The user may click on the model name to see various metadata about the model, for example, the model owner's explanation of the model's results. Section 810 also includes an asset field that allows the user view various metadata about the asset, including the machine characteristics data that were used to produce the ER model's risk score. Finally, section 810 provides the model-generated risk score itself. In this example, the detection criterion is set here so that any risk score above 0.55 will trigger an attack risk detection notification. This threshold may be changed by clicking on the threshold value.

As shown, the GUI 800 also includes a remediation plans section 820. The remediations plans shown in the table are generated, scored, and ranked by a planning system such as the remediation planning system 220 of FIG. 2. As shown in field 822, the remediation plans represent different permutations of three remediation actions [A], [B], and [C], which can be clicked to see more information about those actions. Depending on the type of attack risk, many types of remediation actions may be indicated. For example, possible remediation actions may include applying a patch to the machines, disabling a feature provided by the machines, removing user access privileges from the machines, updating configuration settings on the machines, or isolating certain machines from the larger networks, among other measures. In some embodiments, these remediation actions may be retrieved from a remediation action library (e.g. library 240 of FIG. 2). Field 824 shows the resulting risk scores that were obtained after application of each remediation plan. For example, by applying the first plan (just action [A]), the risk score of the XYZ server fleet will be reduced from 0.88 to 0.32. Fields 826 and 828 indicate different types of cost metrics associated with the remediation plans. For example, field 826 indicates how many man hours each remediation plan will take to implement, and field 828 indicates the downtime to the fleet that will be caused by each plan. In some embodiments, these costs may be computed based on cost metadata stored in the remediation action library, and calculated by the remediation planning system 220. Field 830 indicates a rank of the plans generated by the remediation planning system. In some embodiments, this rank may be generated according to a computed rank metric, which may take into account both the risk score reductions provided by each plan and the associated cost(s) of each plan. As shown in this example, the rank field may be clicked to view or edit the formula used to compute the rank metric.

Finally, in this example, the GUI 800 also provides a generate workflow button 832. In some embodiments, button 832 may allow the user to generate an execution workflow for a user-selected remediation plan (here the plan ranked 1). The generated workflow may include a series of more detailed and concrete steps to carry out the remediation plan. For example, the workflow may indicate specific information to be gathered about assets in the fleet, specific scripts to be run on the assets, and specific approvals to obtain to make such changes to the fleet. In some embodiments, portions of the workflow may be generated or even executed automatically based on the remediation plans selected by the remediation planning system.

Figure 9:
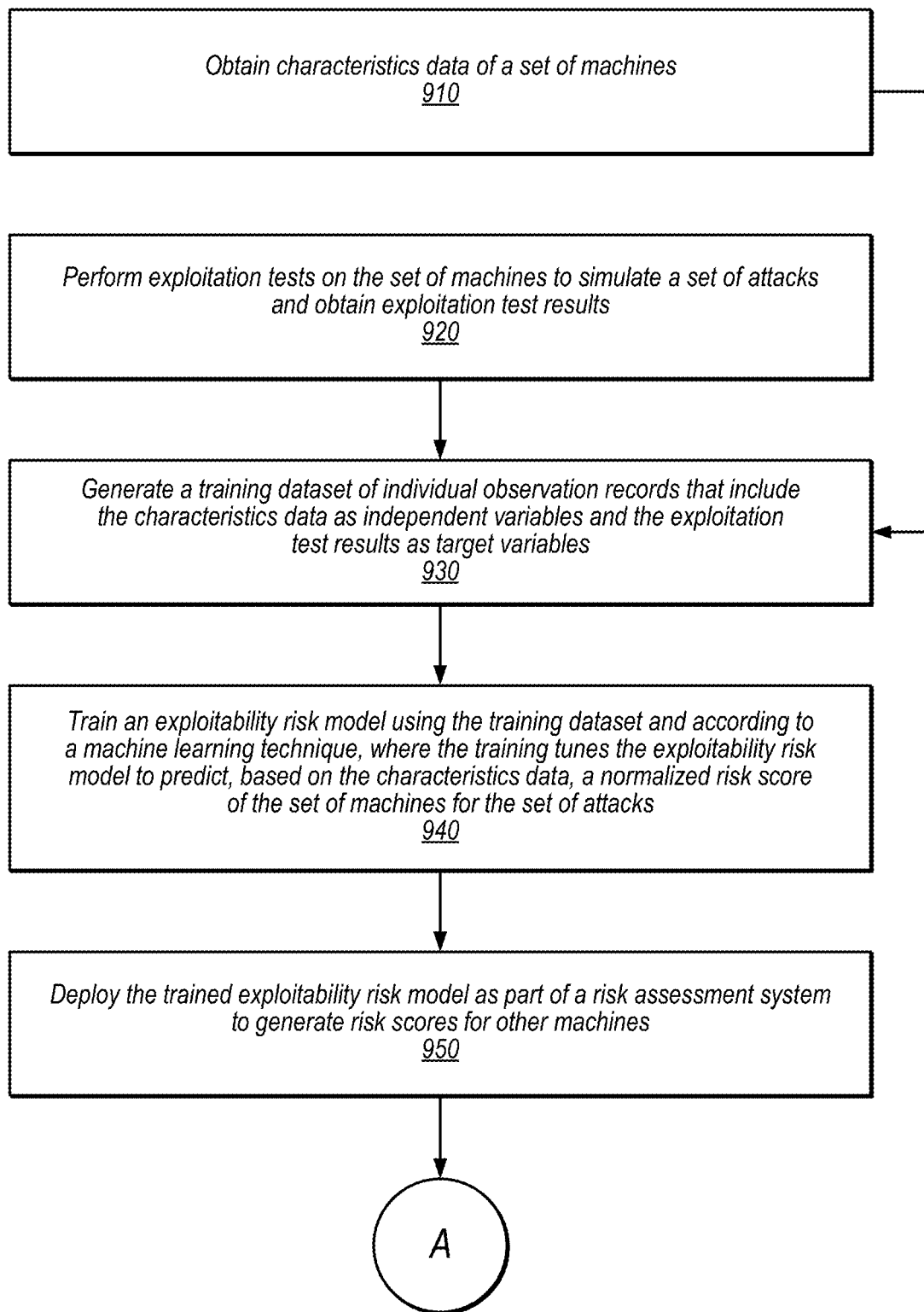
FIG. 9 is a flowchart illustrating a process of training an exploitability risk model to assess the risk of machines for cyberattacks, according to some embodiments.

FIG. 9 is a flowchart illustrating a process of training an exploitability risk model to assess the risk of machines for cyberattacks, according to some embodiments.

The process begins at operation 910, where characteristics data of a set of machines is obtained. In some embodiments, the operation may be performed by the data collection component 122 of FIG. 1 or the data collection service 340 of FIG. 3. The characteristics data may pertain to a single machine (e.g. a single computer) or a group of machines (e.g. a connected network of servers). The characteristics data may include different types of metadata such as metadata 410, 420, or 430 of FIG. 4, or the machine demographics data 510 of FIG. 5. In some embodiments, the characteristics data may be collected for purposes other than to train an exploitability risk model. For example, characteristics data may be collected periodically to maintain a virtual representation of the set of machines, which may be used to perform a variety of machine assessments or monitoring tasks.

At operation 920, exploitation tests are performed on the set of machines to simulate a set of attacks on the machine(s) and obtain exploitation test results. In some embodiments, this operation may be performed by the exploitation testing component 130 of FIG. 1 or the exploitation testing service 342 of FIG. 3. In some embodiments, the exploitation testing component or service may be configured with different testing modules to simulate a variety of cyberattacks against machines. In some embodiments, the exploitation testing may be performed by a machine monitoring service that monitors machines of a large number of client networks and automates the exploitation testing. The exploitation testing may be performed on randomly sampled machine sets selected from the client machines, in accordance with configurable sample criteria (e.g. to test machines with particular traits), or as result of manual requests. The tests may yield results that indicate whether a particular cyberattack or a set of cyberattacks was successful in exploiting the set of machines.

At operation 930, a training dataset is generated, where individual observation records in the dataset includes the collected characteristics data and the exploitation test results. In some embodiments, training dataset may be generated by the model training system 140 of FIG. 1 or the model training service 344 of FIG. 3. In other embodiments as shown in FIG. 6, the training dataset may be generated by the training data collection system 120 of FIG. 1. The generated training dataset may be the training dataset 142 of FIG. 1. As discussed in connection with FIG. 1, the training dataset may be constructed to include the collected characteristics data as the independent variables of each observation record, and the exploitation test results as the target variable(s) of each observation record. The training dataset will be used to train an ER model, such as the ER model 150 of FIG. 1. In some embodiments, multiple training datasets may be created for different phases of model training. For example, a first subset of training data may be used to tune the model parameters, and a second subset of the training data may be used for evaluation purposes, to evaluate the accuracy of the model without modifying the model. In some embodiments, the training dataset may be constructed according to configuration parameters specified via a configuration interface such as the configuration interface 352 of FIG. 3.

At operation 940, an ER model (e.g. ER model 150) is trained using the training dataset in a machine learning technique. The training will tune the ER model to predict, based on input characteristics data about a set of machines, a normalized risk score of the set of machines for the set of attacks that was simulated using exploitation testing. In some embodiments, operation 940 may be performed by the model training system 140 of FIG. 1 or the model training service 344 of FIG. 3. The machine learning technique may be a supervised learning technique where the target variables in the training dataset are used as truth labels to evaluate the model's performance and adjust the model's parameters. In some embodiments, the ER model may be implemented as a logistic regression model. The logistic regression model may model the log odds of an outcome (e.g. whether the set of machines is exploitable) using a linear function that applies different coefficients to individual input features. The model training may employ an expectation maximization or gradient descent algorithm to progressively update the coefficients of the model. In some embodiments, the output of the ER model may be a probability value that indicates how likely the set of machines can be exploited by one or more of the simulated attacks. When the model has been tuned to produce sufficiently accurate results during an evaluation phase, the training process may be deemed to be completed.

At operation 950, the trained ER model is deployed as part of a risk assessment system to generate risk scores for other machines. In some embodiments, the trained model may be ER model 160 of FIG. 1, and the risk assessment system may be the machine risk assessment system 162 of FIG. 1 or the machine assessment service 346 of FIG. 3. In some embodiments, the deployment process may involve copying a packaged form of the ER model to the execution environment of the risk assessment system, and configuration the risk assessment system to invoke the ER model to generate cyberattack risk scores. With the deployed ER model, the risk assessment system will be able to quickly generate risk scores for different machine sets using their characteristics data alone, without having to perform time-consuming exploitation testing on the machines. Moreover, because the risk scores are expressed as probability values, they can be easily compared with other risk scores generated by the model and used in other types of calculations.

Figure 10:
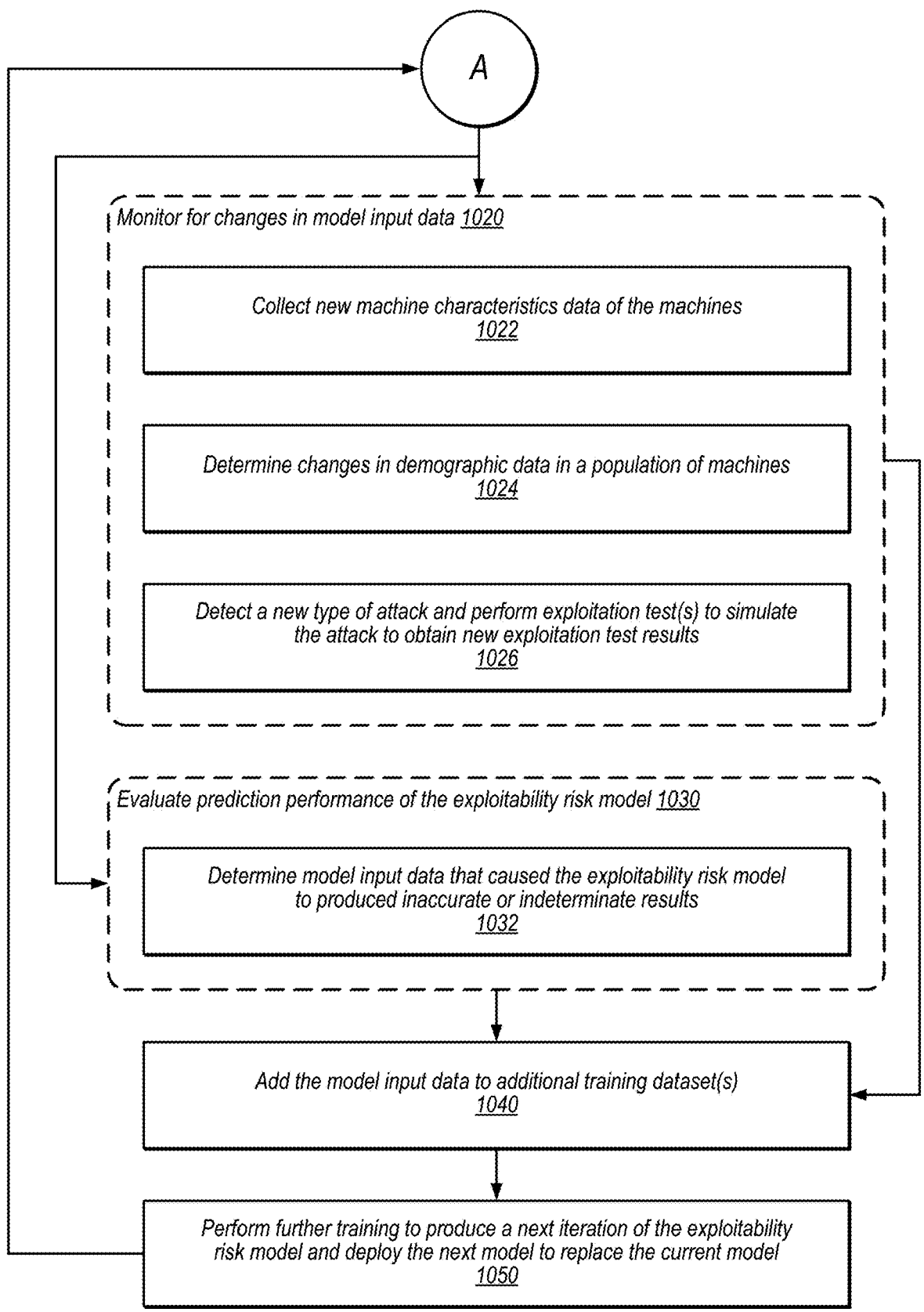
FIG. 10 is a flowchart illustrating a process of collecting additional training data for ongoing training of an exploitability risk model, according to some embodiments.

FIG. 10 is a flowchart illustrating a process of collecting additional training data for ongoing training of an exploitability risk model, according to some embodiments. As shown, the depicted process may continue from the process of FIG. 9, after the deployment of the ER model to the risk assessment system.

As shown, operations 1022, 1024, and 1026 may be performed as part of a monitoring process 1020 to monitor for changes in model input data for the ER model. As discussed in connection with FIG. 6, changed model input data may be selectively added to additional training datasets (e.g. training dataset 650) to perform additional training of the ER model.

At operation 1022, new machine characteristics data of the machines is collected. In some embodiments, the machines may be the same machines that the initial training data is collected from. In some embodiments, the machines may be a universe of client networks that a machine monitoring service is monitoring on behalf of clients. The monitoring may detect changes in particular types of salient characteristics data of the machines, and cause these changes to be added to new training datasets.

At operation 1024, changes in demographic data in a population of machines is determined. The demographic data may be the demographic data 510 of FIG. 5. The demographic data may represent a population of the machines that are being monitored by the machine monitoring service, or data for a larger population of machines available to the public. The demographic data may be periodically updated to reflect the changing nature of machines in the population (e.g. changes in the popularity of certain types of machine features or in the frequency of certain types of cyberattacks). Because such demographic data is used by certain embodiments of ER models (e.g. as discussed in connection with FIG. 5), changes in this data may also be monitored to occasionally trigger new training data to be generated.

At operation 1026, a new type of attack is detected. In this example, the new type of attack is added to a set of modeled attacks for the ER model, and new exploitation tests are performed to simulate the new attack to obtain new exploitation test results. Because the risk score generated by the ER model is now expanded in scope to include this new type of attack, new training of the ER model is needed. The training data for the new training will be constructed to reflect the test results of the new exploitation tests as target variables.

As shown, operation 1032 is performed as part of an evaluation process 1030 that predicts the performance of the ER model. As discussed in connection with FIG. 6, instances of machines that cause the ER model to produce inaccurate results or indeterminate results may also be used to generation additional training data for further training of the model.

At operation 1032, model input data (e.g. machine characteristics data) that caused the ER model to produce inaccurate or indeterminate results are determined. To determine an inaccurate model result, a model performance evaluator component (e.g. evaluator 630 of FIG. 6) may selectively perform validation testing of the model by performing exploitation testing on machine sets evaluated by the model. In some embodiments, machine sets that are determined to be high risk may be tested to confirm the model's prediction. In some embodiments, machines that are determined to be low risk may be nonetheless tested to verify that the machine sets are indeed unexploitable. In some embodiments, inaccurate model results may be detected as a result of an actual cyberattack. To determine that a model result is indeterminate, a configuration setting may be set to specify a range of risk score values (e.g. 40% to 60%) as indeterminate or inconclusive as to the exploitability risk.

After determination of the different types of model input data that may prompt additional model training, the process proceeds to operation 1040, where the model input data are added to additional training datasets. In some embodiments, new observation records may be generated based on the model input data. For example, changed machine characteristics may trigger new exploitation tests to be performed on the subject machines, the new training data records are created from the changed machine characteristics data and results of the new exploitation tests. Similarly, when a machine set is found to produce an indeterminate model risk score, actual exploitation testing may be performed on the machine set to obtain the target variable for the observation record.

The process then proceeds to operation 1050, where further training is performed to produce a next iteration of the ER model and deploy the next iteration to replace the current iteration of the ER model. In some embodiments, the training of the next model will use the current iteration of the ER model as a starting basis. In some embodiments, the next model will be trained from scratch, using a balanced set of training data collected from a last data collection period. The process then loops back so that it is repeated to train another iteration of the ER model for a subsequent period. By continuously evolving the ER model in this manner, the system is able to automatically keep the model up-to-date with changes in the cybersecurity landscape, such as changes in machine characteristics, machine demographics, and cyberattacks. The described process ensures that the model's risk scores reflect the most recently view of the data.

Figure 11:
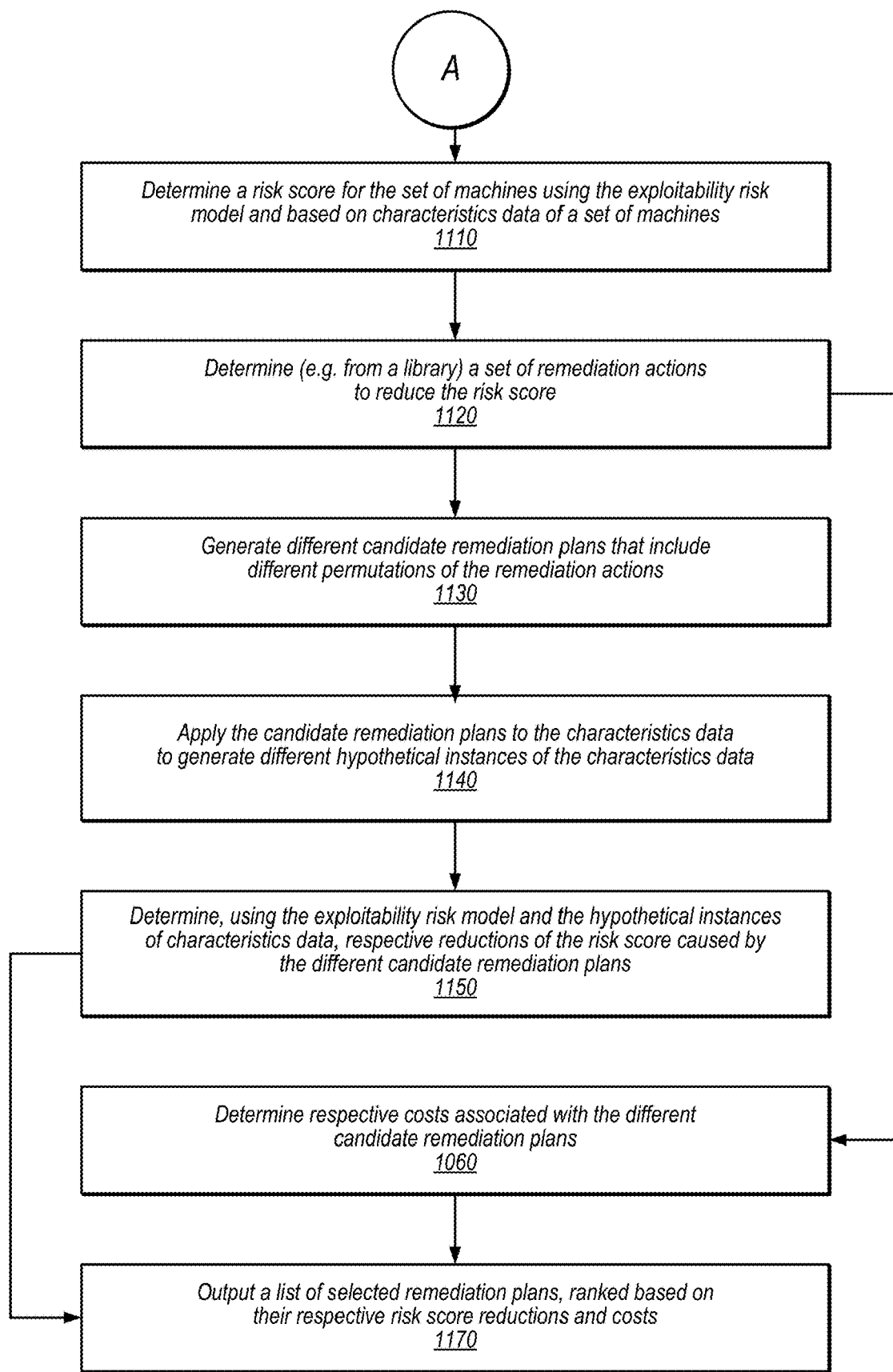
FIG. 11 is a flowchart illustrating a process of using an exploitability risk model to evaluate and select a list of remediation action plans, according to some embodiments.

FIG. 11 is a flowchart illustrating a process of using an exploitability risk model to evaluate and select a list of remediation action plans, according to some embodiments. As shown, the depicted process may continue from the process of FIG. 9.

The process begins at operation 1110, where a risk score is determined for a set of machines using the ER model and based on the characteristics data of the set of machines. Operation 1110 may be performed by the machine risk assessment system 162 or the machine assessment service 346 of FIG. 3, using a deployed version of the ER model (e.g. ER model 160).

At operation 1120, a set of remediation actions to reduce the risk score is determined. In some embodiments, the set of remediation actions may be determined via a remediation plan generator component (e.g. plan generator 230 of FIG. 2), and the actions may be retrieved from a repository such as the remediation action library 240 of FIG. 2. In some embodiments, the remediation action library may store different types of remediation actions to mitigate the risks of particular types of cyberattacks. The remediation actions may be stored in a database system, so that they can be easily looked up based on the type of attack.

At operation 1130, different candidate remediation plans are generated that include different permutations of the remediation actions. In some embodiments, this operation may be performed by the remediation plan generator 230 of FIG. 2. The different permutation of actions may be selected in a pseudorandom fashion, or based on specified constraints or rules of the plan generator. In some embodiments, the generation of remediation plans may be triggered when the risk score determined in operation 1110 exceeds a certain configured threshold. In some embodiments, remediation plans may be generated in response to the detection of an actual cyberattack.

At operation 1140, multiple hypothetical instances of the characteristics data are generated for the set of machines, by applying different candidate remediation plans to the machines' current characteristics data. In some embodiments, this operation may be performed by the remediation plan generator 230 of FIG. 2. The applying of the candidate remediation plans may involve a data transformation of the current characteristics of the machines to the hypothetical characteristics. However, the candidate remediation plans are not actually implemented on the machines.

At operation 1150, risk score reductions are determined for the individual candidate remediation plans. The risk scores reductions may be determined using the ER model, by feeding each instance of the hypothetical machine characteristics to the ER model, and comparing each hypothetical risk score generated by the model with the current risk score. The risk score reduction of a plan may be determined by subtracting the hypothetical risk score from the current risk score. Accordingly, the risk score reduction of each candidate plan reflects how effective the plan is to reduce the modeled risk for the set of attacks. In some embodiments, the determination of risk score reductions may be performed by the remediation plan evaluator 260 of FIG. 2.

At operation 1160, costs associated with different candidate remediation plans are also determined. Depending on the embodiment, the costs may be determined by a component such as the remediation plan generator 230 of FIG. 2 or the remediation plan evaluator 260 of FIG. 2. In some embodiments, the costs may be determined based on cost metadata about individual remediation actions stored in the remediation action library 240. The costs may reflect different types of costs factors such as the amount of work needed to carry out the plan, a dollar amount associated with the plan (e.g. an additional licensing cost), an amount of time needed to carry out the plan, an functional or business impact of the plan, etc.

At operation 1170, a list of selected remediation action plans is provided as output. The selected plans are selected and ranked based on their respective risk score reductions and costs. In some embodiments, for each remediation plan, the cost and the risk score reduction may be combined to determine a rank metric for the plan (e.g. a security gain per unit of cost) that is used to rank the plan. In some embodiments, the output may include only a single best plan determined based on the rank metric. In some embodiments, the output may include a subset of candidate plans whose rank metric values exceed a specified threshold. In some embodiments, the output may be provided as recommendations on a graphical user interface such as the GUI 800 of FIG. 8. In some embodiments, the output may be used to automatically trigger certain actions, such as to generate an execution workflow for a selected remediation plan.

Figure 12:
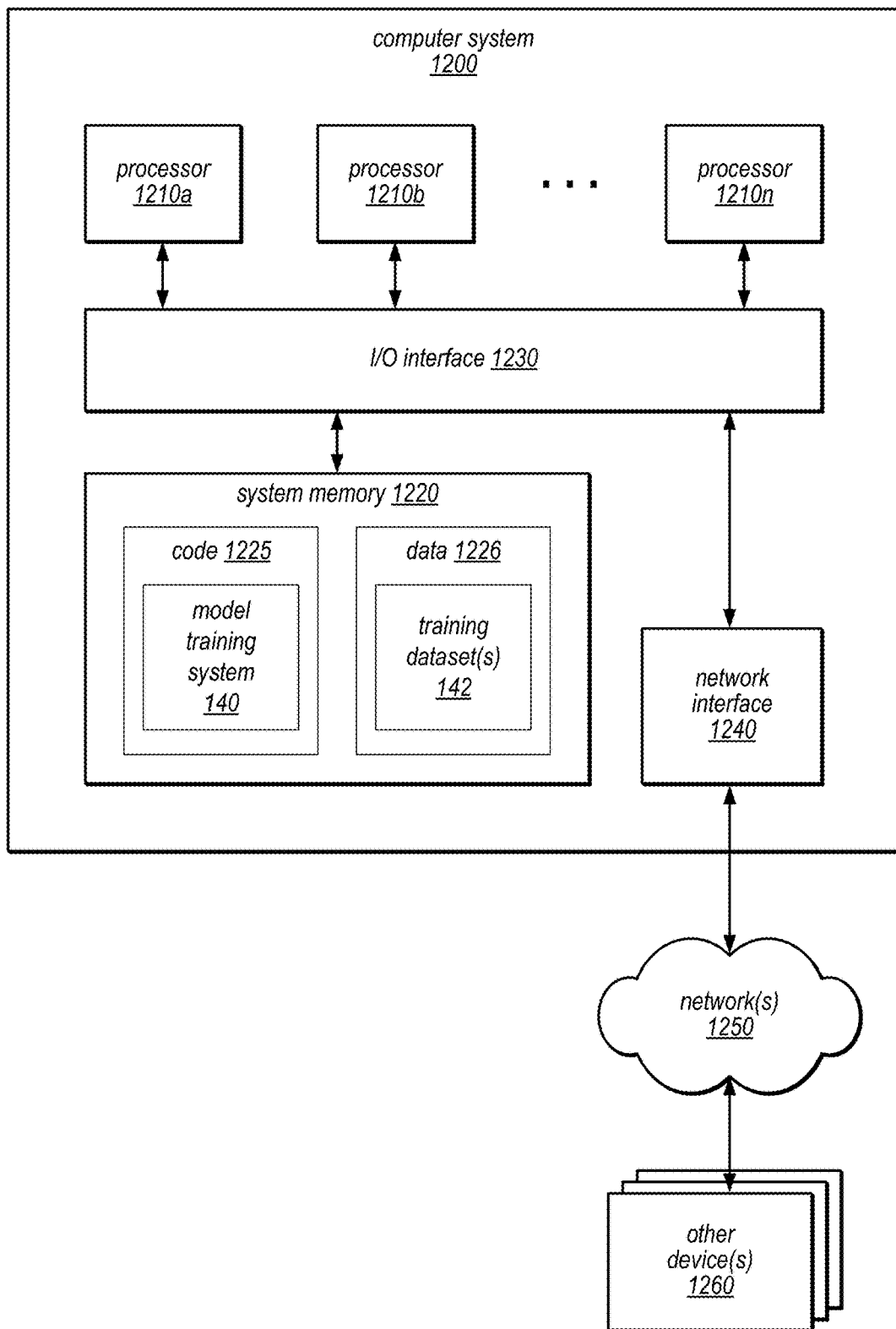
FIG. 12 is a block diagram illustrating an example computer system that can be used to implement one or more portions of a model training system that can be used to train an exploitability risk model, according to some embodiments.

FIG. 12 is a block diagram illustrating an example computer system that can be used to implement one or more portions of a model training system that can be used to train an exploitability risk model, according to some embodiments. For example, the computer system 1200 may be a server that implements one or more components of the model training system 140 of FIG. 1. In some embodiments, the computer system 1200 may be used to implement one or more components of the machine risk assessment system 162 of FIG. 1 or the remediation planning system 220 of FIG. 2.

Computer system 1200 may be implemented using a variety of computing devices, such as a personal computer system, desktop computer, laptop or notebook computer, mainframe computer system, handheld computer, workstation, network computer, a consumer device, application server, mobile telephone, or some other type of computing device.

As shown, computer system 1200 includes one or more processors 1210, which may include multiple cores coupled to a system memory 1220 via an input/output (I/O) interface 1230. Computer system 1200 further includes a network interface 1240 coupled to I/O interface 1230. In some embodiments, computer system 1200 may be a uniprocessor system including one processor 1210, or a multiprocessor system including several processors 1210*a-n*, as shown. The processors 1210 may be any suitable processors capable of executing instructions. For example, in various embodiments, processors 1210 may implement one of a number of instruction set architectures (ISAs), such as the x86, PowerPC, SPARC, or MIPS ISA.

As shown, the computer system 1200 may also include one or more network communication devices (e.g., network interface 1240) for communicating with other systems and/or components over a communications network. For example, an instance of an application executing on computer system 1200 may use network interface 1240 to communicate with another server application executing on another computer system, as described herein.

As shown, computer system 1200 may use its network interface 1240 to communicate with one or more other devices 1260, such as persistent storage devices and/or one or more I/O devices. In some embodiments, some of these other devices may be implemented locally on the computer system 1200, accessible via the I/O interface 1230. In various embodiments, persistent storage devices may include disk drives, tape drives, solid state memory, other mass storage devices, or any other persistent storage device. The computer system 1200 may store instructions and/or data in persistent storage devices, and retrieve the stored instruction and/or data as needed.

As shown, the computer system 1200 may include one or more system memories 1220 that store instructions and data accessible by processor(s) 1210. In various embodiments, system memories 1220 may be implemented using any suitable memory technology, (e.g., one or more of cache, static random-access memory (SRAM), DRAM, RDRAM, EDO RAM, DDR 12 RAM, synchronous dynamic RAM (SDRAM), EEPROM, non-volatile/Flash-type memory, etc.). The system memory 1220 may be used to store code 1225 or executable instructions to implement the methods and techniques described herein. For example, the executable instructions may include instructions to implement the model training system 140, as discussed. The system memory 1220 may also be used to store data 1226 needed or produced by the executable instructions. For example, the in-memory data 1226 may include portions of the training datasets 142, as discussed.

In some embodiments, some of the code 1225 or executable instructions may be persistently stored on the computer system 1200 and may have been loaded from external storage media. The persistent storage of the computer system 1200 and the external media are examples of non-transitory computer-readable storage media, which may be used to store program instructions to be executed by the computer system 1200. A non-transitory computer-readable storage medium may provide the capability to store information in a form readable by a machine (e.g., computer system 1200). Non-transitory computer-readable media may include storage media such as magnetic or optical media, disk or DVD/CD-ROM devices, archival tapes, network-attached storage systems, or other computer systems.

In some embodiments, the I/O interface 1230 may be configured to coordinate I/O traffic between processor 1210, system memory 1220 and any peripheral devices in the system, including through network interface 1240 or other peripheral interfaces. In some embodiments, I/O interface 1230 may perform any necessary protocol, timing or other data transformations to convert data signals from one component (e.g., system memory 1220) into a format suitable for use by another component (e.g., processor 1210). In some embodiments, I/O interface 1230 may include support for devices attached through various types of peripheral buses, such as a variant of the Peripheral Component Interconnect (PCI) bus standard or the Universal Serial Bus (USB) standard, for example. In some embodiments, the function of I/O interface 1230 may be split into two or more separate components, such as a north bridge and a south bridge, for example. Also, in some embodiments, some or all of the functionality of I/O interface 1230, such as an interface to system memory 1220, may be incorporated directly into processor 1210.

In some embodiments, the network interface 1240 may allow data to be exchanged between computer system 1200 and other devices attached to a network. The network interface 1240 may also allow communication between computer system 1200 and various I/O devices and/or remote storage systems. Input/output devices may, in some embodiments, include one or more display terminals, keyboards, keypads, touchpads, scanning devices, voice or optical recognition devices, or any other devices suitable for entering or retrieving data by one or more computer systems 1200. Multiple input/output devices may be present in computer system 1200 or may be distributed on various nodes of a distributed system that includes computer system 1200. In some embodiments, similar input/output devices may be separate from computer system 1200 and may interact with one or more nodes of a distributed system that includes computer system 1200 through a wired or wireless connection, such as over network interface 1250. Network interface 1240 may commonly support one or more wireless networking protocols (e.g., Wi-Fi/IEEE 802.11, or another wireless networking standard). In some embodiments, the network interface 1240 may support communication via telecommunications/telephony networks such as analog voice networks or digital fiber communications networks, via storage area networks such as Fibre Channel SANs, or via any other suitable type of network and/or protocol.

Although the embodiments above have been described in considerable detail, numerous variations and modifications may become apparent to those skilled in the art once the disclosed inventive concepts are fully appreciated. It is intended that the following claims be interpreted to embrace all such variations and modifications, and the above description to be regarded in an illustrative rather than a restrictive sense.

What is claimed is:

1. A system, comprising:
    one or more hardware processors with associated memory that implement a remediation planning system, configured to:
    implement an exploitability risk model trained according to a machine learning technique, wherein the exploitability risk model is trained to determine, based on characteristics data of an individual set of one or more machines, a normalized risk score of the individual set of machines for a set of attacks;
    determine, using the exploitability risk model and based on characteristics data of a set of machines, a risk score for the set of machines;
    determine a plurality of remediation actions for the set of machines to reduce the risk score;
    generate a plurality of candidate remediation plans that include different permutations of the remediation actions;
    apply the candidate remediation plans to the characteristics data to generate updated instances of the characteristics data, wherein the application simulates performance of the candidate remediation plans on the set of machines without performing the candidate remediation plans on the set of machines;
    determine, using the exploitability risk model and based on the updated instances of characteristics data, respective reductions of the risk score caused by the candidate remediation plans; and
    provide an output indicating at least one of the candidate remediation plans as a selected remediation plan and a ranking of at least some of the candidate remediation plans, wherein the selected remediation plan and the ranking are determined based at least in part on the respective reductions of the risk score caused by the candidate remediation plans.

2. The system of claim 1, wherein
    the remediation planning system is implemented as part of a network-accessible service, configured to:
    collect the characteristics data from the machines of the client; and
    provide the selected remediation plan as a recommendation via a graphical user interface of the network-accessible service.

3. The system of claim 2, wherein the network-accessible service is configured to:
    monitor the risk score of the machines of the client over time; and
    provide the recommendation in response to a detection that the risk score exceeds a risk threshold.

4. The system of claim 1,
    wherein the ranking is determined based at least in part on the respective costs of the candidate remediation plans.

5. The system of claim 1, wherein the exploitability risk model is a logistic regression model and trained to output a probability that the set of machines is exploitable by at least one of the set of attacks.

6. The system of claim 1, wherein the remediation planning system is configured to determine the selected remediation plan to include one or more of:
    applying a software patch to the set of machines;
    disabling a feature provided by the set of machines;
    removing one or more access privileges of one or more users from the set of machines;
    updating one or more configuration settings of the set of machines; or
    isolating a particular machine in the set of machines.

7. The system of claim 1, wherein the remediation planning system is configured to retrieve the plurality of remediation actions from a library of remediation actions, wherein the library associates different types of remediation actions with different types of attacks.

8. A method comprising:
    performing, by one or more hardware processors with associated memory that implement a remediation planning system:
    implementing an exploitability risk model trained according to a machine learning technique, wherein the machine learning model is trained to determine, based on characteristics data of an individual set of one or more machines, a normalized risk score of the individual set of machines for a set of attacks;
    determining, using the exploitability risk model and based on characteristics data of a set of machines, a risk score for the set of machines;
    determining a plurality of remediation actions for the set of machines to reduce the risk score;
    generating a plurality of candidate remediation plans that include different permutations of the remediation actions;
    applying the candidate remediation plans to the characteristics data to generate updated instances of the characteristics data, wherein the application simulates performance of the candidate remediation plans on the set of machines without performing the candidate remediation plans on the set of machines;
    determining, using the exploitability risk model and based on the updated instances of characteristics data, respective reductions of the risk score caused by the candidate remediation plans; and
    providing an output indicating at least one of the candidate remediation plans as a selected remediation plan and a ranking of at least some of the candidate remediation plans, wherein the selected remediation plan and the ranking are determined based at least in part on the respective reductions of the risk score caused by the candidate remediation plans.

9. The method of claim 8,
wherein the remediation planning system is implemented as part of a network-accessible service; and
further comprising performing, by the network-accessible service:
collecting the characteristics data from the machines of the client; and
providing the selected remediation plan as a recommendation via a graphical user interface (GUI) of the network-accessible service.

10. The method of claim 9, wherein the network-accessible service is configured to:
monitoring the risk score of the machines of the client over time; and
providing the recommendation in response to a determination that the risk score exceeds a risk threshold.

11. The method of claim 9, further comprising performing, by the network-accessible service:
receiving, via the GUI, user input to modify the selected remediation plan;
generating, in accordance with the user input, a workflow to perform the selected remediation plan; and
providing the workflow via the GUI.

12. The method of claim 8,
wherein the ranking is determined based at least in part on the respective costs of the candidate remediation plans.

13. The method of claim 12,
wherein the respective costs are based on different cost metrics including a number of man hours associated with individual remediation plans and a amount of downtime associated with individual remediation plans.

14. The method of claim 13, further comprising performing, by the remediation planning system:
storing, in a library of remediation actions, respective cost metrics of individual remediation actions; and
determining the respective costs of the selected remediation plans based at least in part on the cost metrics of respective remediation actions in the selected remediation plans.

15. The method of claim 8, wherein the exploitability risk model is a logistic regression model and trained to output a probability that the set of machines is exploitable by at least one of the set of attacks.

16. One or more non-transitory computer-accessible storage media storing program instructions that when executed on or across one or more processors implement at least a portion of a remediation planning system and cause the remediation planning system to:
implement an exploitability risk model trained according to a machine learning technique, wherein the machine learning model is trained to determine, based on characteristics data of a an individual set of one or more machines, a normalized risk score of the individual set of machines for a set of attacks;
determine, using the exploitability risk model and based on characteristics data of a set of machines, a risk score for the set of machines;
determine a plurality of remediation actions for the set of machines to reduce the risk score;
generate a plurality of candidate remediation plans that include different permutations of the remediation actions;
apply the candidate remediation plans to the characteristics data to generate updated instances of the characteristics data, wherein the application simulates performance of the candidate remediation plans on the set of machines without performing the candidate remediation plans on the set of machines;
determine, using the exploitability risk model and based on the updated instances of characteristics data, respective reductions of the risk score caused by the candidate remediation plans; and
provide an output indicating at least one of the candidate remediation plans as a selected remediation plan and a ranking of at least some of the candidate remediation plans, wherein the selected remediation plan and the ranking are determined based at least in part on the respective reductions of the risk score caused by the candidate remediation plans.

17. The one or more non-transitory computer-accessible storage media of claim 16, wherein the set of machines include one or more virtual machines.

18. The one or more non-transitory computer-accessible storage media of claim 16, wherein the program instructions when executed on or across the one or more processors cause the remediation planning system to:
determine a rank metric for each of the candidate remediation plans based at least in part on the reduction of risk score caused by the candidate remediation plan and a respective cost of the candidate remediation plan; and
wherein the ranking of the candidate remediation plans is performed according to their respective rank metrics.

19. The one or more non-transitory computer-accessible storage media of claim 16, wherein the program instructions when executed on or across the one or more processors cause the remediation planning system to:
monitor the risk score for the machines of the client over time; and
provide the output in response to a determination that the risk score meets a specified risk criterion.

20. The one or more non-transitory computer-accessible storage media of claim 16, wherein the program instructions when executed on or across the one or more processors cause the remediation planning system to:
receive, via a graphical user interface (GUI), user input to modify the selected remediation plan;
generate, in accordance with the user input, a workflow to perform the selected remediation plan; and
provide the workflow via the GUI.

* * * * *